(12) United States Patent
DeSalvo et al.

(10) Patent No.: US 11,226,406 B1
(45) Date of Patent: Jan. 18, 2022

(54) DEVICES, SYSTEMS, AND METHODS FOR RADAR-BASED ARTIFICIAL REALITY TRACKING

(71) Applicant: Facebook Technologies, LLC, Menlo Park, CA (US)

(72) Inventors: Riccardo DeSalvo, Pasadena, CA (US); Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Fereydoun Daneshgaran, La Crescenta, CA (US); Joseph Minh Tien, Alhambra, CA (US); Dustin Krogstad, Chino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 349 days.

(21) Appl. No.: 16/391,229

(22) Filed: Apr. 22, 2019

Related U.S. Application Data

(60) Provisional application No. 62/802,458, filed on Feb. 7, 2019.

(51) Int. Cl.
*G01S 13/42* (2006.01)
*H04W 4/021* (2018.01)
*G06T 19/20* (2011.01)
*G06T 19/00* (2011.01)

(52) U.S. Cl.
CPC .......... *G01S 13/426* (2013.01); *G06T 19/006* (2013.01); *G06T 19/20* (2013.01); *H04W 4/021* (2013.01)

(58) Field of Classification Search
None
See application file for complete search history.

(56) References Cited

U.S. PATENT DOCUMENTS

| 4,599,618 A | 7/1986 | Haendel et al. |
|---|---|---|
| 8,638,254 B2 | 1/2014 | Itoh et al. |
| 2008/0088503 A1 | 4/2008 | Beasley |

(Continued)

OTHER PUBLICATIONS

Desalvo Riccardo, "Devices, Systems, and Methods for Radar-Based Artificial Reality Tracking", U.S. Appl. No. 16/515,066, filed Jul. 18, 2019, 84 pages.

(Continued)

*Primary Examiner* — Ryan M Gray
(74) *Attorney, Agent, or Firm* — FisherBroyles, LLP

(57) ABSTRACT

A radar system may include a wearable device dimensioned to be worn by a user of an artificial reality system. The radar system may also include at least one radar device that is secured to the wearable device and transmits at least one frequency-modulated radar signal to at least one transponder located within a physical environment of the user. The radar system may further include at least one processing device communicatively coupled to the radar device. The processing device may detect a signal returned to the radar device from the transponder in response to the frequency-modulated radar signal and then calculate, based at least in part on a frequency of the returned signal, a distance between the transponder and the radar device. Various other devices, systems, and methods are also disclosed.

17 Claims, 14 Drawing Sheets

(56) References Cited

U.S. PATENT DOCUMENTS

| | | |
|---|---|---|
| 2008/0150899 A1 | 6/2008 | Lin |
| 2008/0291158 A1 | 11/2008 | Park et al. |
| 2009/0212920 A1 | 8/2009 | Yang |
| 2009/0289831 A1 | 11/2009 | Akita et al. |
| 2011/0007035 A1 | 1/2011 | Shai |
| 2015/0021481 A1 | 1/2015 | Cavallaro et al. |
| 2018/0074600 A1* | 3/2018 | Park .................. G01S 13/88 |
| 2018/0088339 A1* | 3/2018 | Aruga ............... G02B 27/0172 |
| 2019/0064341 A1 | 2/2019 | Bunch et al. |
| 2019/0182415 A1* | 6/2019 | Sivan .................. G06F 1/163 |
| 2019/0200914 A1 | 7/2019 | Wagner et al. |
| 2020/0089314 A1 | 3/2020 | Poupyrev et al. |
| 2020/0174095 A1 | 6/2020 | Altintas et al. |

OTHER PUBLICATIONS

Desalvo Riccardo, "Devices, Systems, and Methods for Radar-Based Artificial Reality Tracking", U.S. Appl. No. 16/515,067, filed Jul. 18, 2019, 78 pages.

"Radar Basics", URL: http://www.radartutorial.eu/02.basics/Frequency%20Modulated%20Continuous%20Wave%2020Radar.en.html, Apr. 14, 2014, pp. 1-6.

Wikipedia, "Transponder", URL: https://en.wikipedia.org/wiki/Transponder, Apr. 5, 2005, pp. 1-4.

Desalvo et al., "Devices, Systems, and Methods for Radar-Based Artifical Reality Tracking", U.S. Appl. No. 62/802,458, filed Jul. 2, 2019, 61 pages.

* cited by examiner

DEVICES, SYSTEMS, AND METHODS FOR RADAR-BASED ARTIFICIAL REALITY TRACKING

CROSS REFERENCE TO RELATED APPLICATION

This application claims the benefit of U.S. Provisional Application No. 62/802,458 filed Feb. 7, 2019, the disclosure of which is incorporated in its entirety, by this reference.

BRIEF DESCRIPTION OF DRAWINGS

The accompanying drawings illustrate a number of example embodiments and are a part of the specification. Together with the following description, these drawings demonstrate and explain various principles of the instant disclosure.

Figure 1:
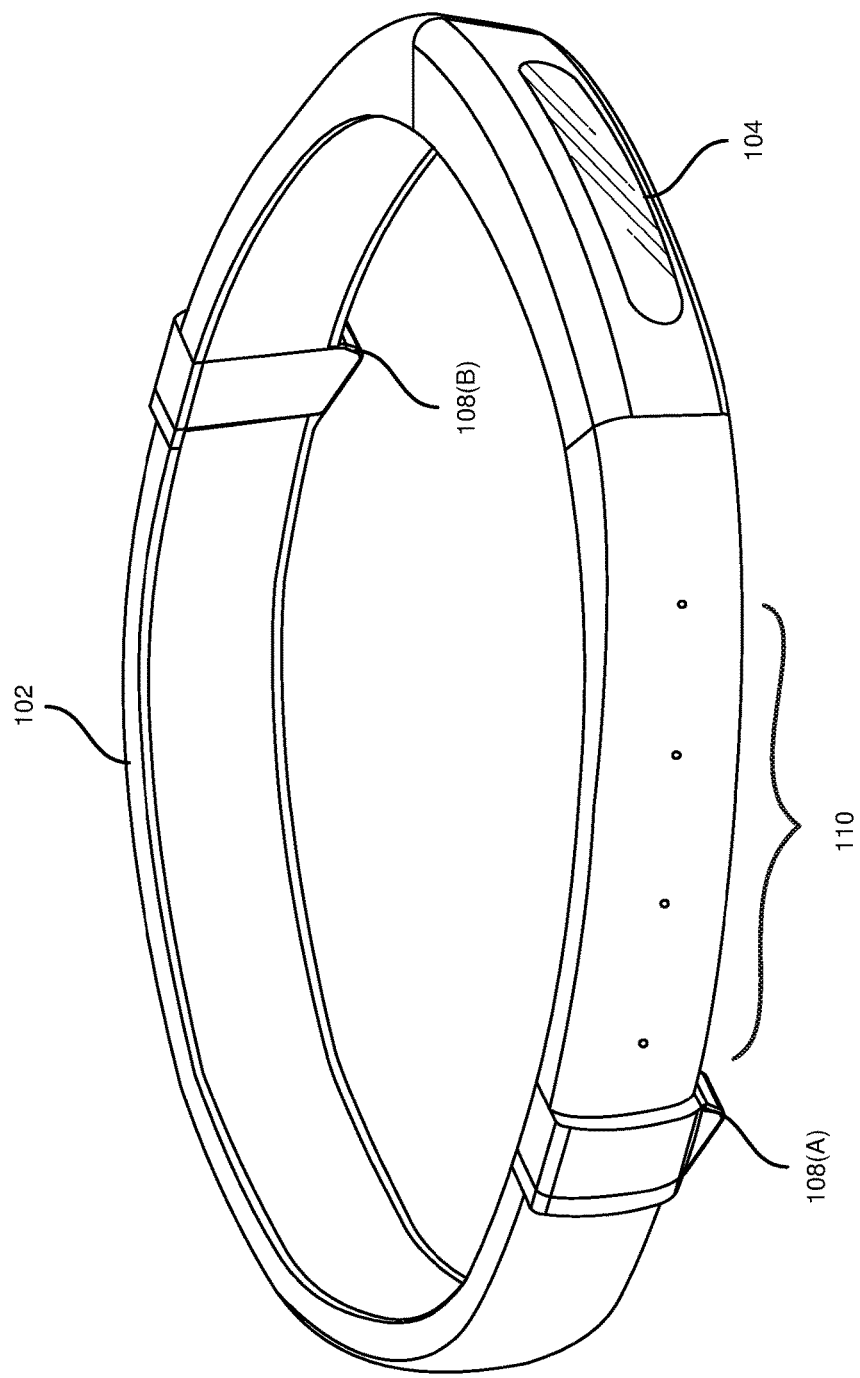
FIG. 1 is an illustration of an exemplary artificial reality headband that may be used in connection with embodiments of this disclosure.

While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

Over the last several years, artificial reality systems have revolutionized the way people experience various kinds of digital media. For example, an artificial reality headset may allow users to experience realistic, immersive virtual environments while playing video games, during flight simulation training, or even when interacting with co-workers around the globe. In addition to such artificial reality applications, wearable artificial reality devices may also enable users to augment reality and/or combine certain aspects of reality with those of the virtual world.

Despite incredible advances in such technology, traditional artificial reality systems may still have certain deficiencies that negatively impact the overall user experience. For example, some traditional artificial reality systems may struggle to accurately and/or quickly determine the locations and/or positions of a user's body parts. Additionally or alternatively, some traditional artificial reality systems may struggle to accurately and/or quickly detect movements and/or changes in position made by the user's body parts. Accordingly, such artificial reality systems may be unable to update virtual content (such as graphics and/or haptic feedback) with sufficient speed and/or resolution. The instant disclosure, therefore, identifies and addresses a need for additional devices, systems, and methods for radar-based artificial reality tracking.

The present disclosure is generally directed to devices, systems, and methods for tracking the movement of wearable artificial reality devices. As will be explained in greater detail below, these devices, systems, and methods may provide numerous features and benefits. For example, these devices, systems, and methods may facilitate calculating, identifying, and/or tracking the position and/or movement of a certain body part of an artificial reality user in three-dimensional space. Additionally or alternatively, these devices, systems, and methods may facilitate calculating, identifying, and/or tracking the location, orientation, and/or movement of an artificial reality headset and/or a user's head in three-dimensional space.

As a further example, these devices, systems, and methods may facilitate providing a remote and/or outside view of a local user to a remote user via an interactive artificial reality application (such as a room-sharing and/or video conferencing application). As another example, these devices, systems, and methods may involve and/or incorporate one or more radar devices and/or frequency-shifting transponders. In this example, the frequency-shifting transponders may enable the radar devices to accurately measure the distance between a user's head and certain body parts even when that distance would be too small for accurate measurement by the radar devices alone. In other words, without the involvement and/or incorporation of the frequency-shifting transponders, such radar devices may be unable to accurately measure those small distances due to the so-called blind zone.

The following will provide, with reference to FIGS. 1-6, detailed descriptions of various types of exemplary artificial reality devices that may facilitate and/or contribute to a user's artificial reality experience. Detailed descriptions of exemplary devices and/or systems that facilitate and/or implement radar-based artificial reality tracking will be described in connection with FIGS. 7-10 and 13. Detailed descriptions of exemplary triangulation and/or three-dimensional localization techniques and/or calculations will be described in connection with FIG. 11. Detailed descriptions of an exemplary frequency-modulated radar signal and/or frequency model will be described in connection with FIG. 12. In addition, the discussion corresponding to FIG. 14 will provide detailed descriptions of an exemplary method for radar-based artificial reality tracking.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is augmented reality system 100 in FIG. 1. Other artificial reality systems may include an NED that also provides visibility into the real world (e.g., augmented reality system 200 in FIG. 2) or that visually immerses a user in an artificial reality (e.g., virtual reality system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, augmented reality system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. Augmented reality system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, augmented reality system 100 may not necessarily include an NED positioned in front of a user's eyes. Augmented reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented reality system 100 may not include an NED, augmented reality system 100 may include other types of screens or visual feedback devices (e.g., a display screen integrated into a side of frame 102).

Figure 2:
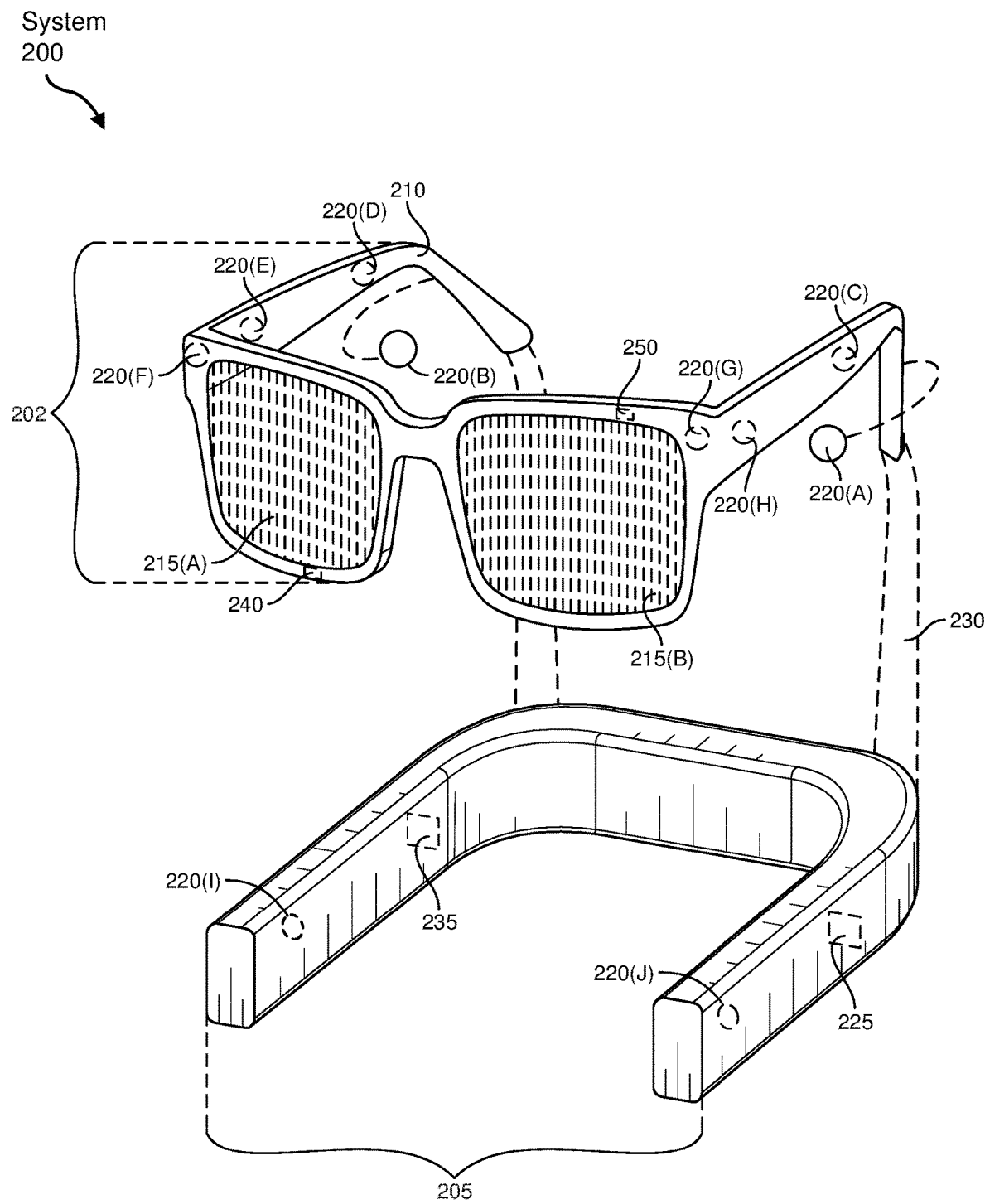
FIG. 2 is an illustration of exemplary augmented reality glasses that may be used in connection with embodiments of this disclosure.

The embodiments discussed in this disclosure may also be implemented in augmented reality systems that include one or more NEDs. For example, as shown in FIG. 2, augmented reality system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While augmented reality system 200 includes two displays, embodiments of this disclosure may be implemented in augmented reality systems with a single NED or more than two NEDs.

In some embodiments, augmented reality system 200 may include one or more sensors, such as sensor 240. Sensor 240 may generate measurement signals in response to motion of augmented reality system 200 and may be located on substantially any portion of frame 210. Sensor 240 may represent a position sensor, an inertial measurement unit (IMU), a depth camera assembly, or any combination thereof. In some embodiments, augmented reality system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

Augmented reality system 200 may also include a microphone array with a plurality of acoustic transducers 220(A)-220(J), referred to collectively as acoustic transducers 220. Acoustic transducers 220 may be transducers that detect air pressure variations induced by sound waves. Each acoustic transducer 220 may be configured to detect sound and convert the detected sound into an electronic format (e.g., an analog or digital format). The microphone array in FIG. 2 may include, for example, ten acoustic transducers: 220(A) and 220(B), which may be designed to be placed inside a corresponding ear of the user, acoustic transducers 220(C), 220(D), 220(E), 220(F), 220(G), and 220(H), which may be positioned at various locations on frame 210, and/or acoustic transducers 220(I) and 220(J), which may be positioned on a corresponding neckband 205.

In some embodiments, one or more of acoustic transducers 220(A)-(F) may be used as output transducers (e.g., speakers). For example, acoustic transducers 220(A) and/or 220(B) may be earbuds or any other suitable type of headphone or speaker.

The configuration of acoustic transducers 220 of the microphone array may vary. While augmented reality system 200 is shown in FIG. 2 as having ten acoustic transducers 220, the number of acoustic transducers 220 may be greater or less than ten. In some embodiments, using higher numbers of acoustic transducers 220 may increase the amount of audio information collected and/or the sensitivity and accuracy of the audio information. In contrast, using a lower number of acoustic transducers 220 may decrease the computing power required by an associated controller 250 to process the collected audio information. In addition, the position of each acoustic transducer 220 of the microphone array may vary. For example, the position of an acoustic transducer 220 may include a defined position on the user, a defined coordinate on frame 210, an orientation associated with each acoustic transducer 220, or some combination thereof.

Acoustic transducers 220(A) and 220(B) may be positioned on different parts of the user's ear, such as behind the pinna or within the auricle or fossa. Or, there may be additional acoustic transducers 220 on or surrounding the ear in addition to acoustic transducers 220 inside the ear canal. Having an acoustic transducer 220 positioned next to an ear canal of a user may enable the microphone array to collect information on how sounds arrive at the ear canal. By positioning at least two of acoustic transducers 220 on either side of a user's head (e.g., as binaural microphones), augmented reality device 200 may simulate binaural hearing and capture a 3D stereo sound field around about a user's head. In some embodiments, acoustic transducers 220(A) and 220(B) may be connected to augmented reality system 200 via a wired connection 230, and in other embodiments, acoustic transducers 220(A) and 220(B) may be connected to augmented reality system 200 via a wireless connection (e.g., a Bluetooth connection). In still other embodiments, acoustic transducers 220(A) and 220(B) may not be used at all in conjunction with augmented reality system 200.

Acoustic transducers 220 on frame 210 may be positioned along the length of the temples, across the bridge, above or below display devices 215(A) and 215(B), or some combination thereof. Acoustic transducers 220 may be oriented such that the microphone array is able to detect sounds in a wide range of directions surrounding the user wearing the augmented reality system 200. In some embodiments, an optimization process may be performed during manufacturing of augmented reality system 200 to determine relative positioning of each acoustic transducer 220 in the microphone array.

In some examples, augmented reality system 200 may include or be connected to an external device (e.g., a paired device), such as neckband 205. Neckband 205 generally represents any type or form of paired device. Thus, the following discussion of neckband 205 may also apply to various other paired devices, such as charging cases, smart watches, smart phones, wrist bands, other wearable devices, hand-held controllers, tablet computers, laptop computers and other external compute devices, etc.

As shown, neckband 205 may be coupled to eyewear device 202 via one or more connectors. The connectors may be wired or wireless and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof.

Pairing external devices, such as neckband 205, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 205 may be communicatively coupled with eyewear device 202 and/or to other devices. These other devices may provide certain functions (e.g., tracking, localizing, depth mapping, processing, storage, etc.) to augmented reality system 200. In the embodiment of FIG. 2, neckband 205 may include two acoustic transducers (e.g., 220(1) and 220(J)) that are part of the microphone array (or potentially form their own microphone subarray). Neckband 205 may also include a controller 225 and a power source 235.

Acoustic transducers 220(1) and 220(J) of neckband 205 may be configured to detect sound and convert the detected sound into an electronic format (analog or digital). In the embodiment of FIG. 2, acoustic transducers 220(1) and 220(J) may be positioned on neckband 205, thereby increasing the distance between the neckband acoustic transducers 220(1) and 220(J) and other acoustic transducers 220 positioned on eyewear device 202. In some cases, increasing the distance between acoustic transducers 220 of the microphone array may improve the accuracy of beamforming performed via the microphone array. For example, if a sound is detected by acoustic transducers 220(C) and 220(D) and the distance between acoustic transducers 220(C) and 220 (D) is greater than, e.g., the distance between acoustic transducers 220(D) and 220(E), the determined source location of the detected sound may be more accurate than if the sound had been detected by acoustic transducers 220(D) and 220(E).

Controller 225 of neckband 205 may process information generated by the sensors on neckband 205 and/or augmented reality system 200. For example, controller 225 may process information from the microphone array that describes sounds detected by the microphone array. For each detected sound, controller 225 may perform a direction-of-arrival (DOA) estimation to estimate a direction from which the detected sound arrived at the microphone array. As the microphone array detects sounds, controller 225 may populate an audio data set with the information. In embodiments in which augmented reality system 200 includes an inertial measurement unit, controller 225 may compute all inertial and spatial calculations from the IMU located on eyewear device 202. A connector may convey information between augmented reality system 200 and neckband 205 and between augmented reality system 200 and controller 225. The information may be in the form of optical data, electrical data, wireless data, or any other transmittable data form. Moving the processing of information generated by augmented reality system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as virtual reality system 300 in FIG. 3, that mostly or completely covers a user's field of view. Virtual reality system 300 may include a front rigid body 302 and a band 304 shaped to fit around a user's head. Virtual reality system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented reality system 200 and/or virtual reality system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented reality system 200 and/or virtual reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented reality system 100, augmented reality system 200, and/or virtual reality system 300 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
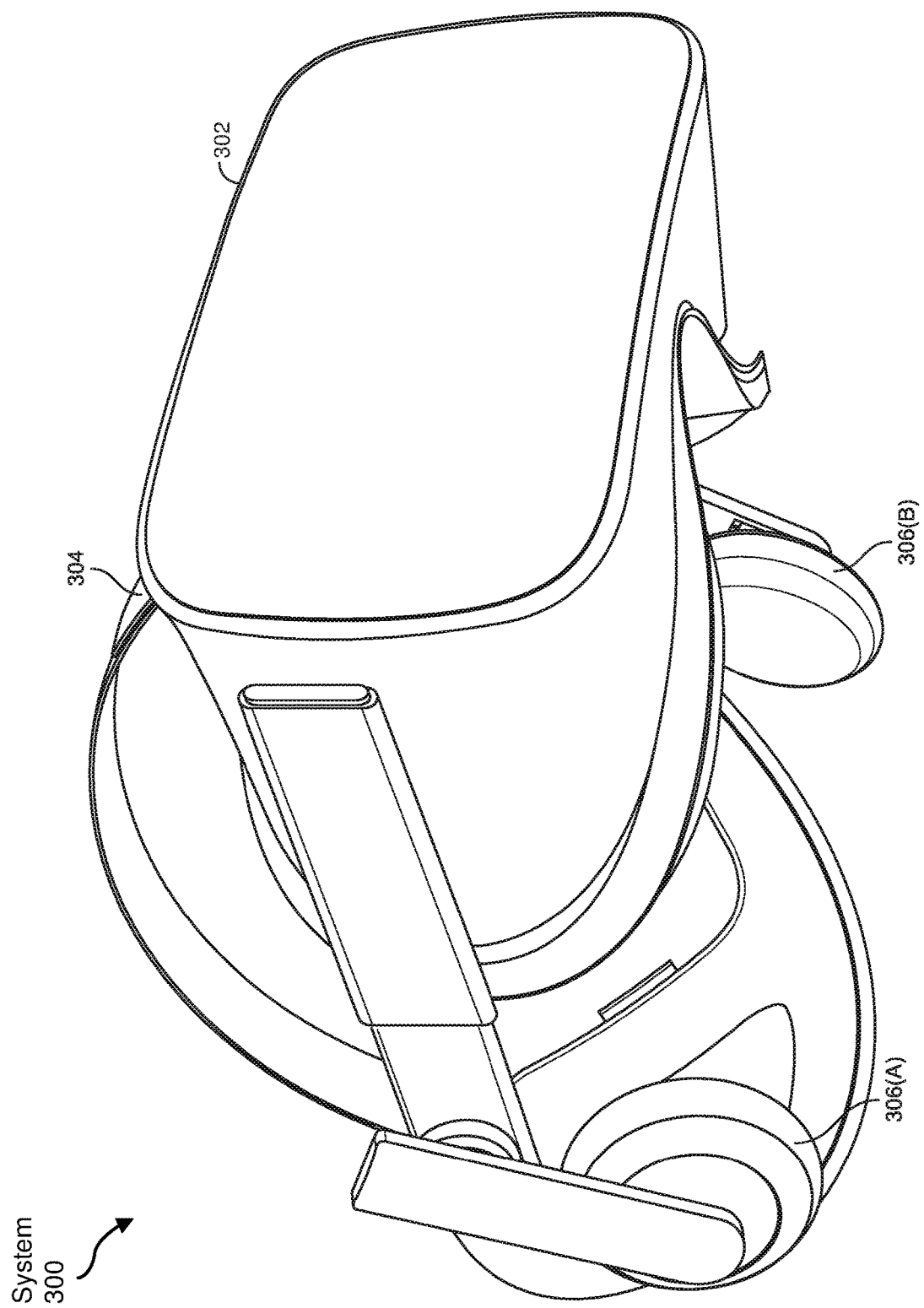
FIG. 3 is an illustration of an exemplary virtual reality headset that may be used in connection with embodiments of this disclosure.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some augmented reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented reality and virtual reality devices (such as systems 100, 200, and 300 of FIGS. 1-3, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented reality headset or virtual reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented reality or virtual reality headset may initiate a DOA analysis to determine the location of a sound source. The DOA analysis may include analyzing the intensity, spectra, and/or arrival time of each sound at the artificial reality device to determine the direction from which the sounds originated. The DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The augmented reality or virtual reality headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensors that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

As noted, augmented reality systems 100, 200, and 300 may be used with a variety of other types of devices to provide a more compelling artificial reality experience. These devices may be haptic interfaces with transducers that provide haptic feedback and/or that collect haptic information about a user's interaction with an environment. The artificial reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4:
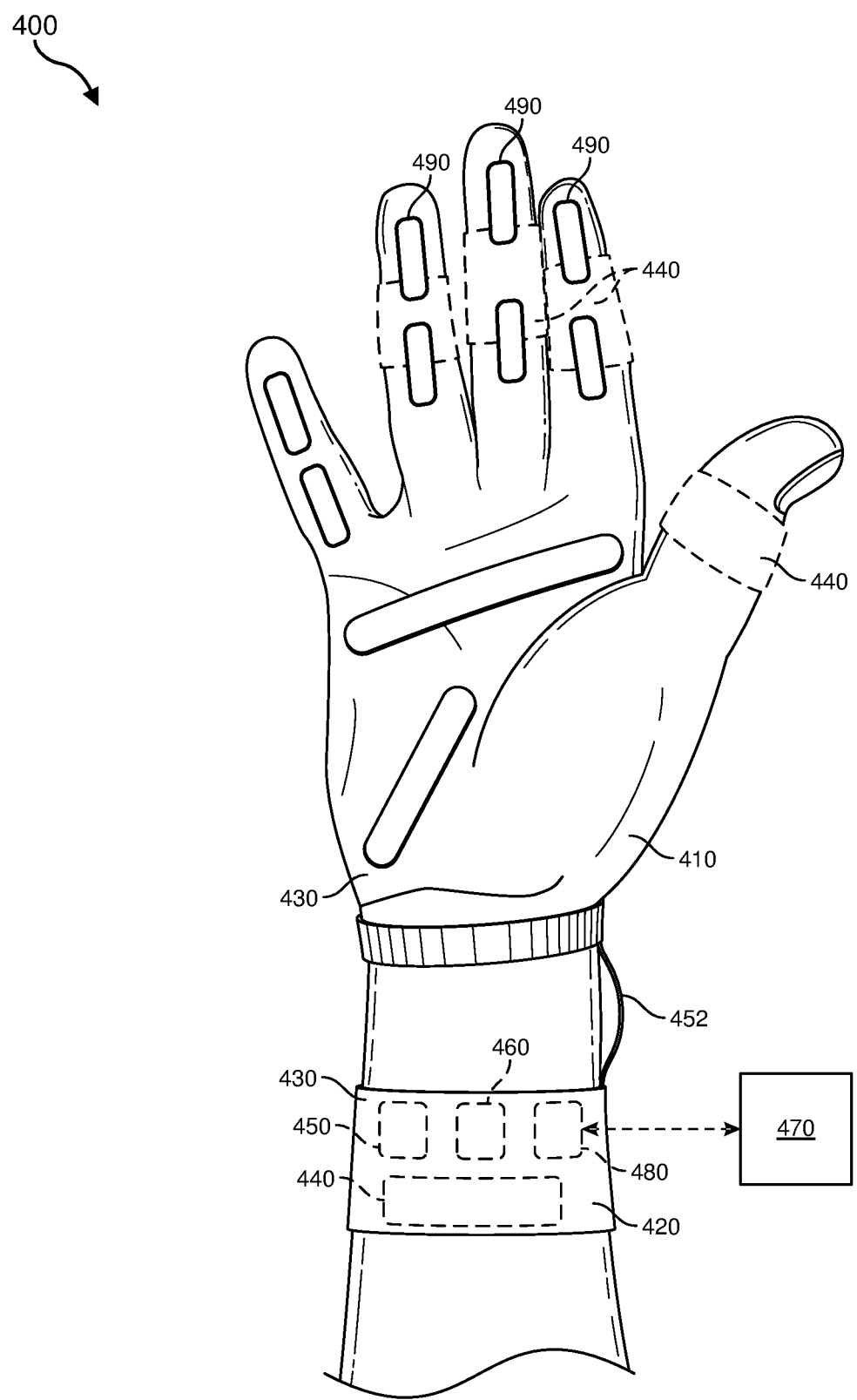
FIG. 4 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4 illustrates a vibrotactile system 400 in the form of a wearable glove (haptic device 410) and wristband (haptic device 420). Haptic device 410 and haptic device 420 are shown as examples of wearable devices that include a flexible, wearable textile material 430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 440 may be positioned at least partially within one or more corresponding pockets formed in textile material 430 of vibrotactile system 400. Vibrotactile devices 440 may be positioned in locations to provide a vibrating sensation (e.g., haptic feedback) to a user of vibrotactile system 400. For example, vibrotactile devices 440 may be positioned to be against the user's finger(s), thumb, or wrist, as shown in FIG. 4. Vibrotactile devices 440 may, in some examples, be sufficiently flexible to conform to or bend with the user's corresponding body part(s).

A power source 450 (e.g., a battery) for applying a voltage to the vibrotactile devices 440 for activation thereof may be electrically coupled to vibrotactile devices 440, such as via conductive wiring 452. In some examples, each of vibrotactile devices 440 may be independently electrically coupled to power source 450 for individual activation. In some embodiments, a processor 460 may be operatively coupled to power source 450 and configured (e.g., programmed) to control activation of vibrotactile devices 440.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 470. For example, vibrotactile system 400 may, in some examples, include a communications interface 480 for receiving and/or sending signals to the other device or system 470. The other device or system 470 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 480 may enable communications between vibrotactile system 400 and the other device or system 470 via a wireless (e.g., Wi-Fi, Bluetooth, cellular, radio, etc.) link or a wired link. If present, communications interface 480 may be in communication with processor 460, such as to provide a signal to processor 460 to activate or deactivate one or more of the vibrotactile devices 440.

Vibrotactile system 400 may optionally include other subsystems and components, such as touch-sensitive pads 490, pressure sensors, motion sensors, position sensors, lighting elements, and/or user interface elements (e.g., an on/off button, a vibration control element, etc.). During use, vibrotactile devices 440 may be configured to be activated for a variety of different reasons, such as in response to the user's interaction with user interface elements, a signal from the motion or position sensors, a signal from the touch-sensitive pads 490, a signal from the pressure sensors, a signal from the other device or system 470, etc.

Although power source 450, processor 460, and communications interface 480 are illustrated in FIG. 4 as being positioned in haptic device 420, the present disclosure is not so limited. For example, one or more of power source 450, processor 460, or communications interface 480 may be positioned within haptic device 410 or within another wearable textile.

Figure 5:
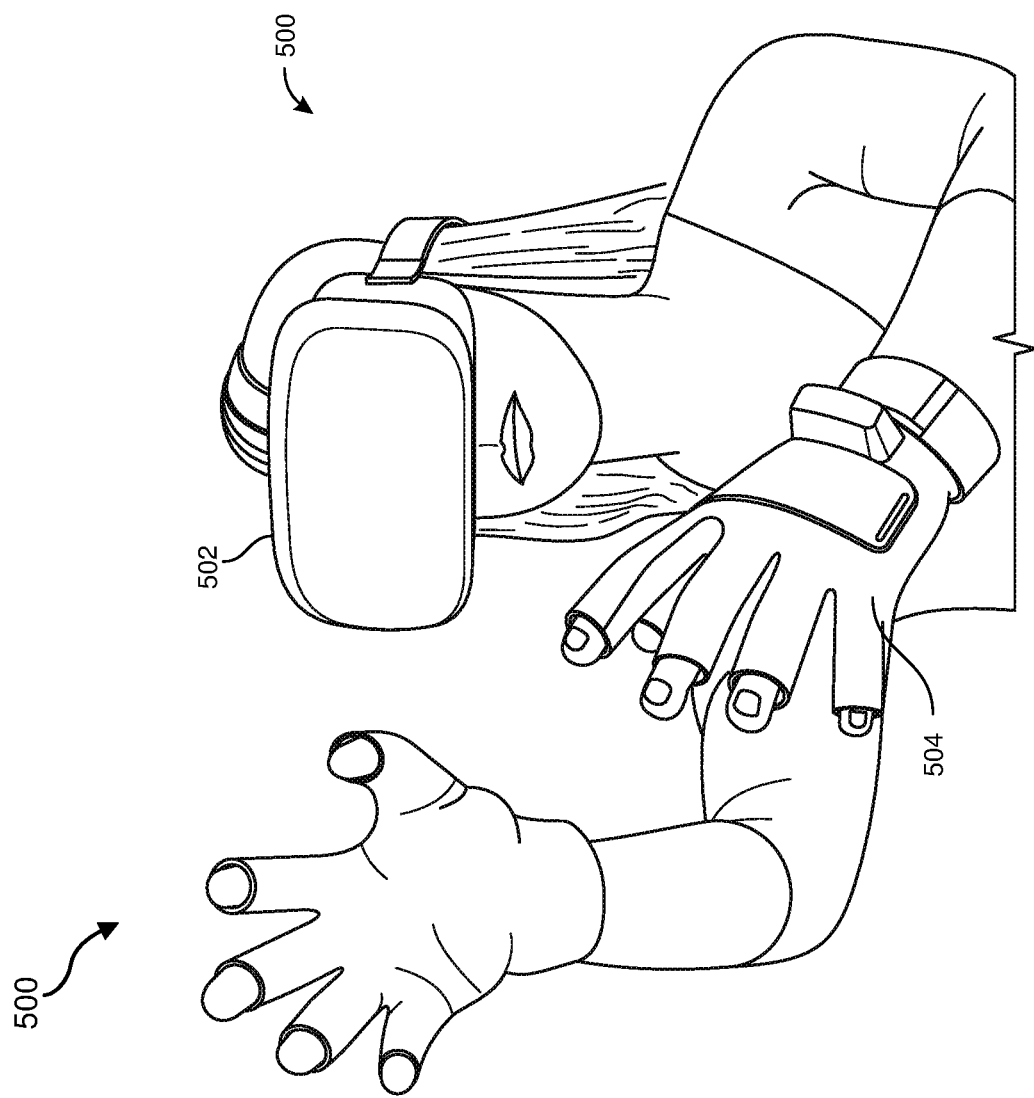
FIG. 5 is an illustration of an exemplary virtual reality environment according to embodiments of this disclosure.

Haptic wearables, such as those shown in and described in connection with FIG. 4, may be implemented in a variety of types of artificial reality systems and environments. FIG. 5 shows an example artificial reality environment 500 including one head-mounted virtual reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 502 generally represents any type or form of virtual reality system, such as virtual reality system 300 in FIG. 3. Haptic device 504 generally represents any type or form of wearable device, worn by a use of an artificial reality system, that provides haptic feedback to the user to give the user the perception that he or she is physically engaging with a virtual object. In some embodiments, haptic device 504 may provide haptic feedback by applying vibration, motion, and/or force to the user. For example, haptic device 504 may limit or augment a user's movement. To give a specific example, haptic device 504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 504 to send action requests to a console. Examples of action requests include, without limitation, requests to start an application and/or end the application and/or requests to perform a particular action within the application.

Figure 6:
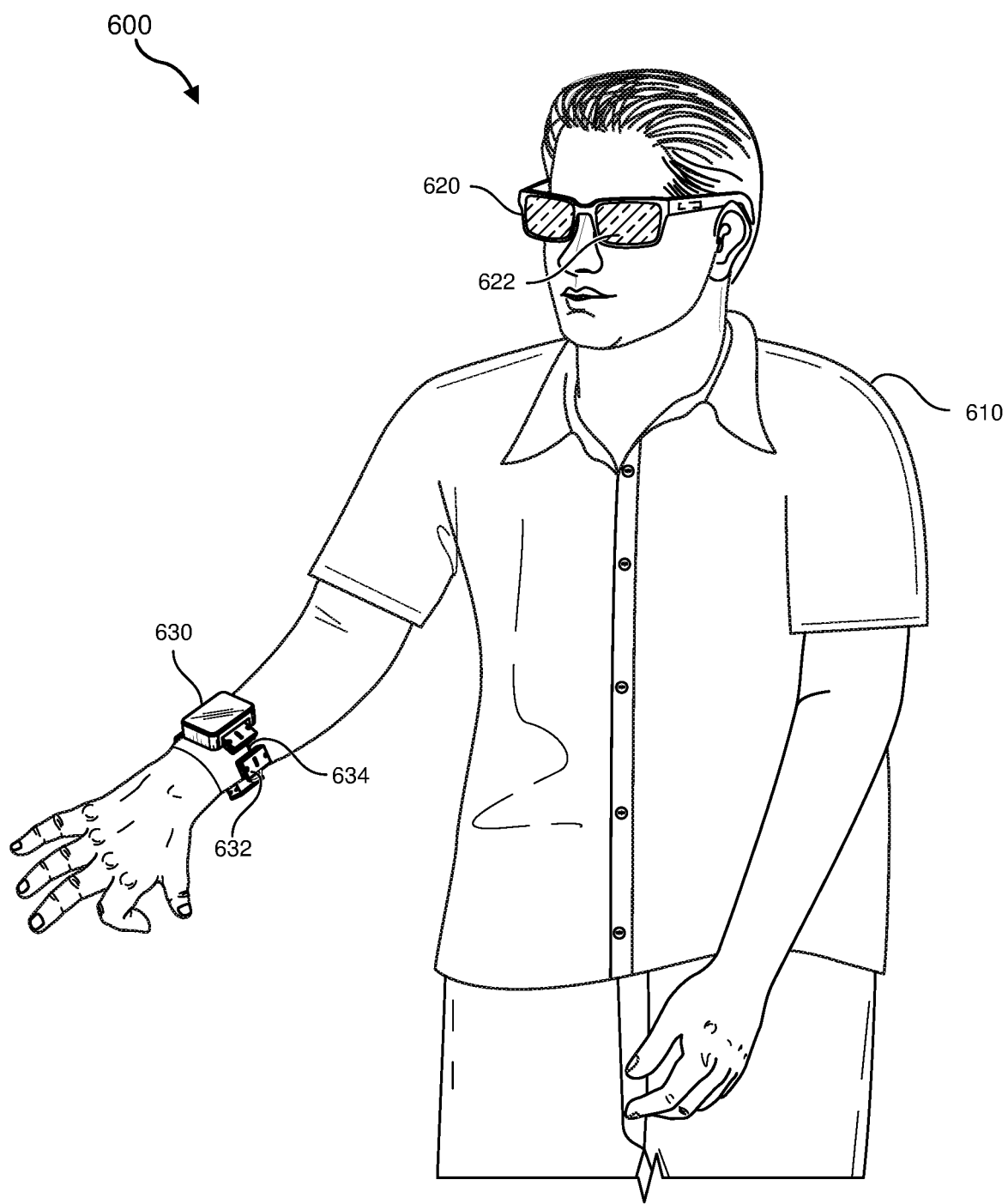
FIG. 6 is an illustration of an exemplary augmented reality environment according to embodiments of this disclosure.

While haptic interfaces may be used with virtual reality systems, as shown in FIG. 5, haptic interfaces may also be used with augmented reality systems, as shown in FIG. 6. FIG. 6 is a perspective view a user 610 interacting with an augmented reality system 600. In this example, user 610 may wear a pair of augmented reality glasses 620 that have one or more displays 622 and that are paired with a haptic device 630. Haptic device 630 may be a wristband that includes a plurality of band elements 632 and a tensioning mechanism 634 that connects band elements 632 to one another.

One or more of band elements 632 may include any type or form of actuator suitable for providing haptic feedback. For example, one or more of band elements 632 may be configured to provide one or more of various types of cutaneous feedback, including vibration, force, traction, texture, and/or temperature. To provide such feedback, band elements 632 may include one or more of various types of actuators. In one example, each of band elements 632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 410, 420, 504, and 630 may include any suitable number and/or type of haptic transducer, sensor, and/or feedback mechanism. For example, haptic devices 410, 420, 504, and 630 may include one or more mechanical transducers, piezoelectric transducers, and/or fluidic transducers. Haptic devices 410, 420, 504, and 630 may also include various combinations of different types and forms of transducers that work together or independently to enhance a user's artificial reality experience. In one example, each of band elements 632 of haptic device 630 may include a vibrotactor (e.g., a vibrotactile actuator) configured to vibrate in unison or independently to provide one or more of various types of haptic sensations to a user.

The artificial reality systems described above in connection with FIGS. 1-6 may facilitate and/or contribute to artificial reality experiences for users donning wearables that implement radar-based artificial reality tracking. As will be described in greater detail below in connection with FIGS. 7-14, such radar-based artificial reality tracking may facilitate determining the three-dimensional position of certain wearables and/or body parts of users, providing remote views of users via interactive artificial reality applications, and/or expanding or improving the short-range capabilities and/or accuracy of radar devices incorporated into wearables.

Figure 7:
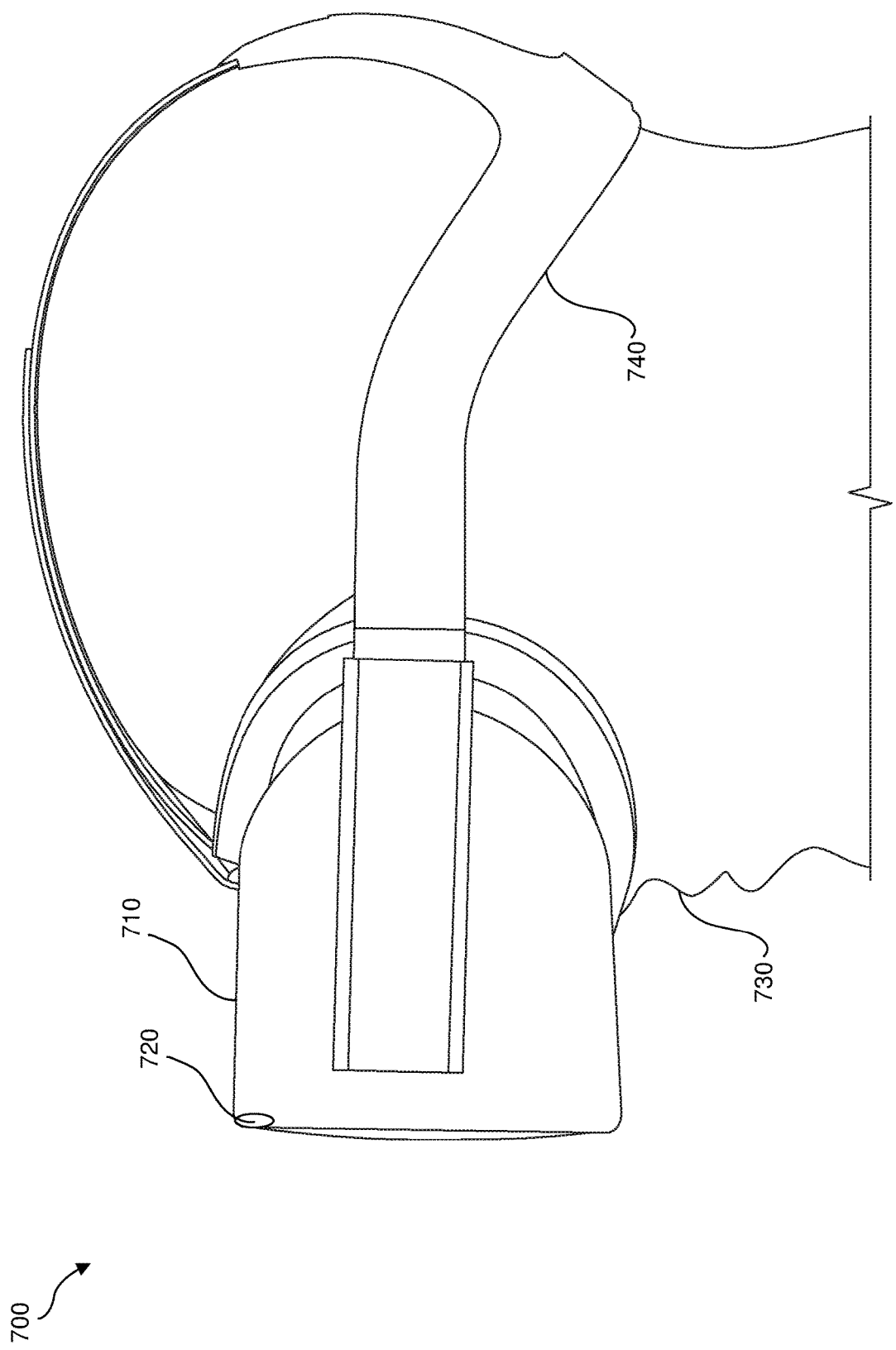
FIG. 7 is an illustration of an exemplary artificial reality system that includes a wearable device that facilitates radar-based artificial reality tracking.

FIG. 7 illustrates an exemplary artificial reality system 700 that includes a wearable device 710 dimensioned and/or configured to be worn by a user 730. As illustrated in FIG. 7, wearable device 710 may include and/or incorporate a radar device 720. In some examples, radar device 720 may include and/or represent Frequency-Modulated Continuous-Wave (FMCW) technology. Examples of radar device 720 include, without limitation, FMCW radar devices, sinusoidal-wave radar devices, sawtooth-wave radar devices, triangle-wave radar devices, square-wave radar devices, pulse radar devices, variations or combinations of one or more of the same, and/or any other suitable radar device.

In some examples, radar device 720 may transmit frequency-modulated radar signals to one or more transponders located within a physical environment of user 730. Additionally or alternatively, radar device 720 may receive and/or detect frequency-modulated radar signals returned and/or retransmitted by such transponders.

In some examples, wearable device 710 may include and/or represent a head-mounted display. In one example, the term "head-mounted display" may refer to any type or form of display device or system that is worn on or about a user's face and displays visual content to the user. Head-mounted displays may display content in any suitable way, including via a screen (e.g., an LCD or LED screen), a projector, a cathode ray tube, an optical mixer, etc. Head-mounted displays may display content in one or more media formats. For example, head-mounted displays may display video, photos, computer-generated imagery (CGI), and/or variations or combinations of one or more of the same.

Head-mounted displays may provide diverse and distinctive user experiences. Some head-mounted displays may provide virtual reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear.

As illustrated in FIG. 7, user 730 may place artificial reality system 700 on the user's head such that wearable device 710 is positioned and/or rests on the user's face. By placing wearable device 710 on his or her face in this way, user 730 may situate a head-mounted display over his or her eyes to experience and/or view virtual content presented on the head-mounted display. User 730 may also secure the head-mounted display of wearable device 710 in the correct position by wrapping strap 740 around the back of the user's head.

Figure 8:
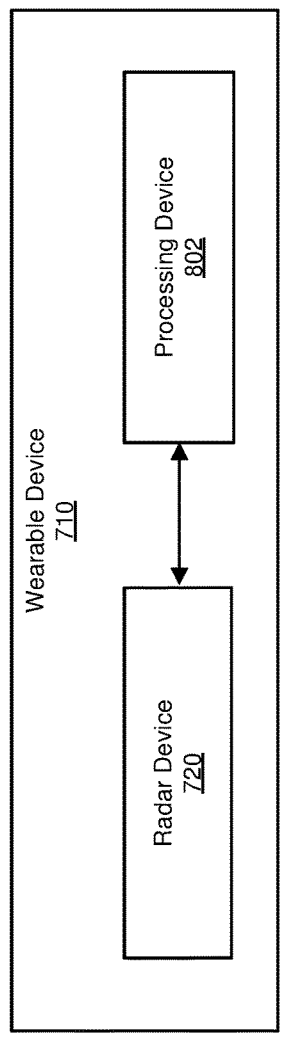
FIG. 8 is a block diagram of an exemplary wearable device that facilitates radar-based artificial reality tracking.

FIG. 8 is a block diagram of an exemplary wearable device 710 that facilitates radar-based artificial reality tracking. As illustrated in FIG. 8, wearable device 710 may include radar device 720 and a processing device 802. In some examples, processing device 802 may be communicatively coupled to radar device 720. In one example, processing device 802 may include and/or represent a hardware-implemented processor capable of interpreting and/or executing computer-readable instructions. Additional examples of processing device 802 include, without limitation, microprocessors, microcontrollers, Central Processing Units (CPUs), Field-Programmable Gate Arrays (FPGAs) that implement softcore processors, Application-Specific Integrated Circuits (ASICs), radiofrequency mixers, radio-communications circuitry, electrical circuitry, portions of one or more of the same, variations or combinations of one or more of the same, and/or any other suitable physical processor.

Figure 9:
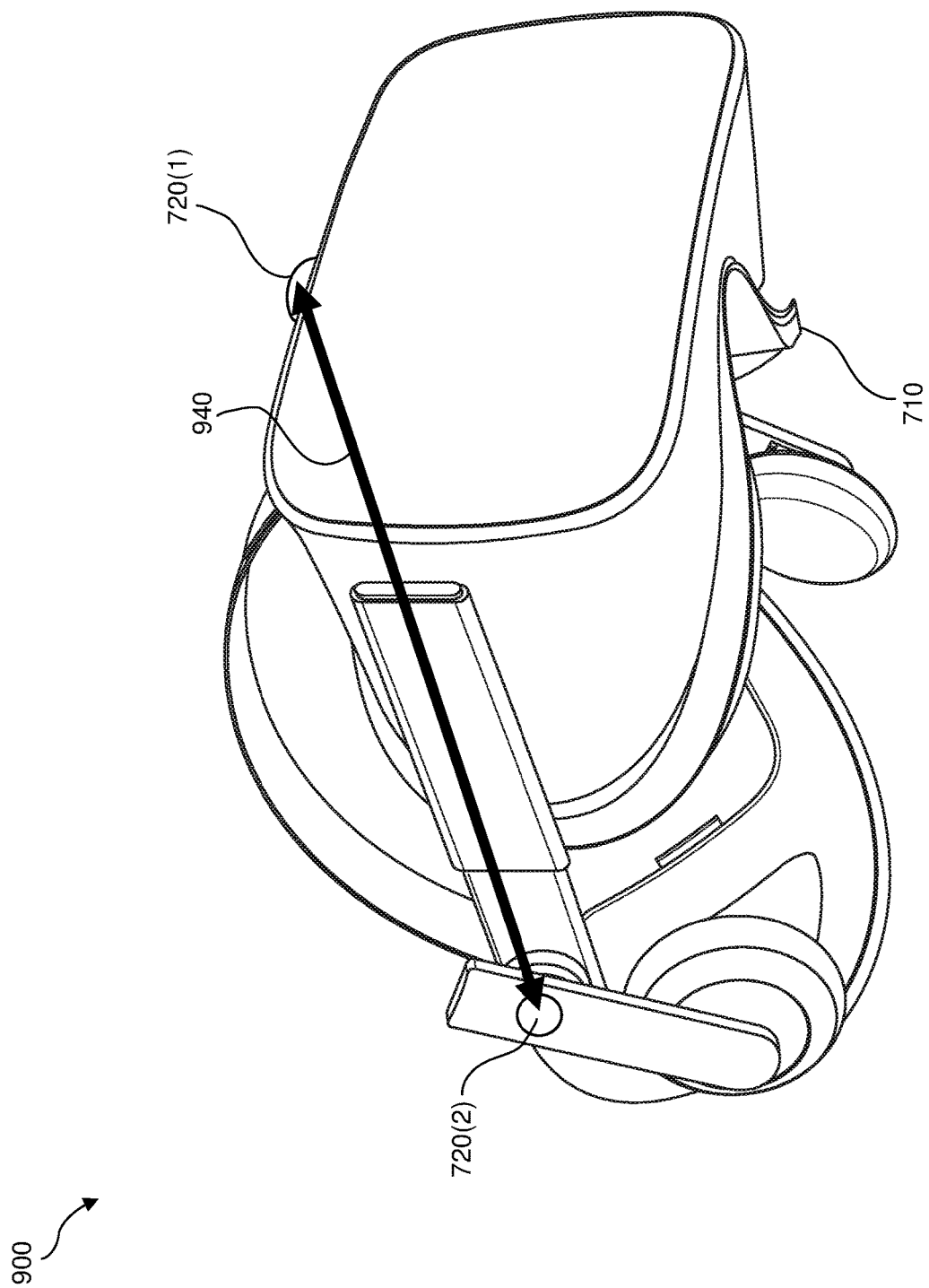
FIG. 9 is an illustration of an exemplary artificial reality system that includes a wearable device for radar-based artificial reality tracking.

FIG. 9 illustrates an exemplary artificial reality system 900 that includes wearable device 710 dimensioned and/or configured to be worn by a user. As illustrated in FIG. 7, wearable device 710 may include and/or incorporate multiple radar devices. For example, radar devices 720(1)-(2) may be secured to wearable device 710 in different positions. More specifically, radar device 720(1) may be secured to wearable device 710 above the user's nose and/or at the middle of the user's forehead, and radar device 720(2) may be secured to wearable device 710 proximate to the user's right ear. Although not visible in FIG. 9, another radar device may be secured to wearable device 710 proximate to the user's left ear. In one embodiment, to improve the accuracy and/or precision of the radar-based tracking of wearable device 710, these various radar devices may be situated and/or spaced as far apart from one another in three-dimensional space as possible on wearable device 710.

In some examples, radar devices 720(1)-(2) may be separated from one another by a known distance 940 on wearable device 710. In such examples, radar device 720(1) and the other radar device proximate to the user's left ear may also be separated from one another by a known distance on wearable device 710. Additionally or alternatively, radar device 720(2) and the other radar device proximate to the user's left ear may be separated from one another by a known distance on wearable device 710. As will be described in greater detail below, the known distances between these various radar devices may be used to facilitate radar-based artificial reality tracking, triangulation, and/or three-dimensional localization.

Figure 10:
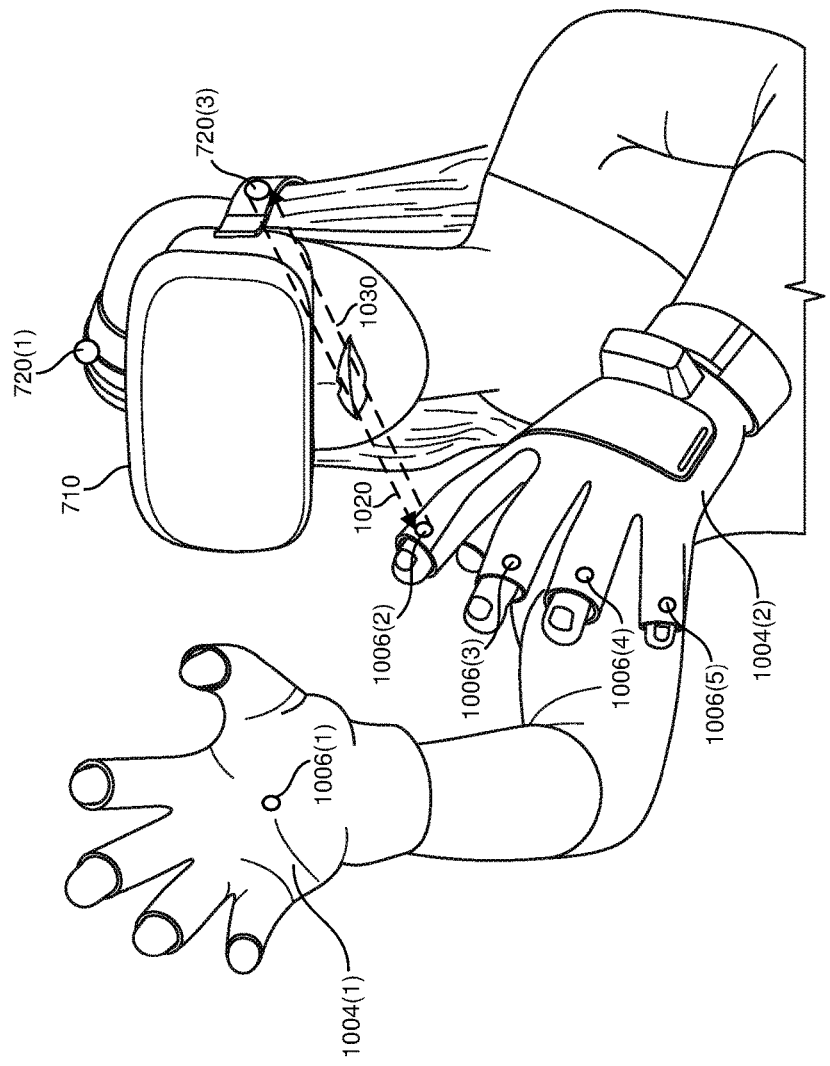
FIG. 10 is an illustration of an exemplary artificial reality system that includes a wearable device for radar-based artificial reality tracking.

FIG. 10 illustrates an exemplary artificial reality system 1000 that includes wearable device 710 and wearable accessories 1004(1)-(2) worn by a user. As illustrated in FIG. 10, wearable device 710 may include and/or incorporate radar devices 720(1) and 720(3). Wearable device 710 may also include and/or incorporate radar devices 720(2) (not visible in FIG. 10) situated proximate to the user's right ear.

In some examples, wearable accessory 1004(1) may be worn by the user on his or her right hand, and wearable accessory 1004(2) may be worn by the user on his or her left hand. In one example, wearable accessories 1004(1)-(2) may each include and/or represent gloves that fit and/or partially envelope the user's hands. Additional examples of wearable accessories 1004(1)-(2) include, without limitation, wristbands, pendants, bracelets, rings, jewelry, anklebands, clothing, electronic textiles, shoes, clips, variations or combinations of one or more of the same, and/or any other suitable wearable accessories.

As illustrated in FIG. 10, wearable accessories 1004(1)-(2) may each include and/or incorporate one or more transponders. For example, wearable accessory 1004(1) may include and/or incorporate a transponder 1006(1) and any other transponders that are not visible in FIG. 10. Similarly, wearable accessory 1004(2) may include and/or incorporate transponders 1006(2), 1006(3), 1006(4), 1006(5) and any other transponders that are not visible in FIG. 10.

In some examples, radar device 720(3) may transmit a frequency-modulated radar signal 1020 to transponder 1006(2) located proximate to the user's left index finger. In one example, frequency-modulated radar signal 1020 may sweep across and/or between a certain range of frequencies. In this example, the frequency of signal 1020 may vary linearly over a certain period of time.

In some examples, transponder 1006(2) may detect and/or receive frequency-modulated radar signal 1020 from radar device 720(3). Upon receiving frequency-modulated radar signal 1020, transponder 1006(2) may reflect, echo, return and/or otherwise retransmit the signal back to radar device 720(3). This reflected, echoed, returned, and/or retransmitted signal may be represented and/or referred to as returned signal 1030 in FIG. 10 for purposes of distinction.

In some examples, transponder 1006(2) may include and/or represent a repeater that simply amplifies and returns the frequency-modulated radar signal back to radar device 720(3) without modifying the signal with any form of frequency shifting. Additionally or alternatively, transponder 1006(2) may actively perform frequency shifting on the frequency-modulated radar signal prior to returning the signal back to radar device 720(3). In other words, transponder 1006(2) may translate signal 120 in the frequency domain by known amounts. For example, upon receiving frequency-modulated radar signal 1020, transponder 1006(2) may form returned signal 1030 by shifting signal 1020 by a certain amount of frequency via modulation. Transponder 1006(2) may then transmit returned signal 1030 to radar device 720(3).

In some examples, radar device 720(3) may detect and/or receive returned signal 1030 from transponder 1006(2). In one example, radar device 720(3) may pass and/or forward returned signal 1030 to processing device 802 of wearable device 710. Upon detecting and/or receiving returned signal 1030, processing device 802 may determine and/or identify the frequency of returned signal 1030 and/or compensate for the frequency shifting performed by transponder 1006(2). For example, processing device 802 may remove a certain frequency offset from returned signal 1030. In this example, processing device 802 may then use the frequency of returned signal 1030 to calculate the distance between transponder 1006(2) and radar 720(3).

In some examples, radar device 720(3) may transmit and/or broadcast frequency-modulated radar signal 1020 to many or even all of transponders 1006(1)-(6). In such examples, any of transponders 1006(1)-(6) may function and/or operate in the same ways as transponder 1006(2). For example, transponders 1006(1)-(6) may each form returned signals by shifting radar signal 1020 by a certain amount of frequency and then returning those shifted signals back to radar device 720(3). In this way, processing device 802 of wearable device 710 may be able to use the frequencies of those returned signals to calculate the various distances between each of transponders 1006(1)-(6) and radar device 720(3). Simultaneously scanned transponders may then be distinguished from one another based on the frequency shifts they induce on the returned signal.

In some examples, any of radar devices 720(1)-(3) may function and/or operate in the same ways as radar device 720(3). For example, radar devices 720(1)-(3) may each transmit and/or broadcast a frequency-modulated radar signal to one or more of transponders 1006(1)-(6). In this example, transponders 1006(1)-(6) may each form returned signals by shifting the incoming radar signal by a certain amount of frequency and then returning that shifted signal back to the corresponding radar device. In this way, processing device 802 of wearable device 710 may be able to use the frequencies of such returned signals to calculate the various distances between transponders 1006(1)-(6) and radar devices 720(1)-(3).

Frequency shifting may serve a variety of purposes and/or provide a variety of benefits within artificial reality system 1000. As one example, frequency shifting by transponders 1006(1)-(6) may expand and/or extend the detection range of radar devices 720(1)-(3) to reach the so-called blind zone. For example, by shifting frequency-modulated radar signal 1020 to form returned signal 1030, transponder 1006(2) may enable processing device 802 to calculate an unambiguous distance measurement between transponder 1006(2) and radar device 720(3) even when transponder 1006(2) is within a minimum distance threshold of radar device 720(3). In this example, the minimum distance threshold may be outside the normal detection range of radar device 720(3). In other words, radar device 720(3) may be unable to accurately measure the distance but for and/or without transponder 1006(2) performing such frequency shifting when transponder 1006(2) is too close to radar device 720(3).

As another example, frequency shifting by transponders 1006(1)-(6) may enable radar devices 720(1)-(3) and/or processing device 802 to distinguish one transponder from another. For example, transponder 1006(1) may be programmed and/or designed to shift the frequency of radar signal 1020 by a certain offset to a first frequency band that is unique to and/or reserved for transponder 1006(1). In this example, transponder 1006(2) may be programmed and/or designed to shift the frequency of radar signal 1020 by a certain offset to a second frequency band that is unique to and/or reserved for transponder 1006(2). Accordingly, the first and second frequency bands may be mutually exclusive. Thus, processing device 802 may be able to distinguish between transponders 1006(1) and 1006(2) because, in this example, the first and second frequency bands are mutually exclusive.

In certain examples, some of transponders 1006(1)-(6) may operate on separate and/or different communication channels from one another. Accordingly, such transponders may be tuned to retransmit only incoming frequency-modulated radar signals within a specific frequency range. In such examples, some of radar devices 720(1)-(3) may also operate on specific and/or different communication channels from one another. In this way, one of radar devices 720(1)-(3) may be paired to one of transponders 1006(1)-(6) to the exclusion of the rest by way of the specific frequency range.

Figure 11:
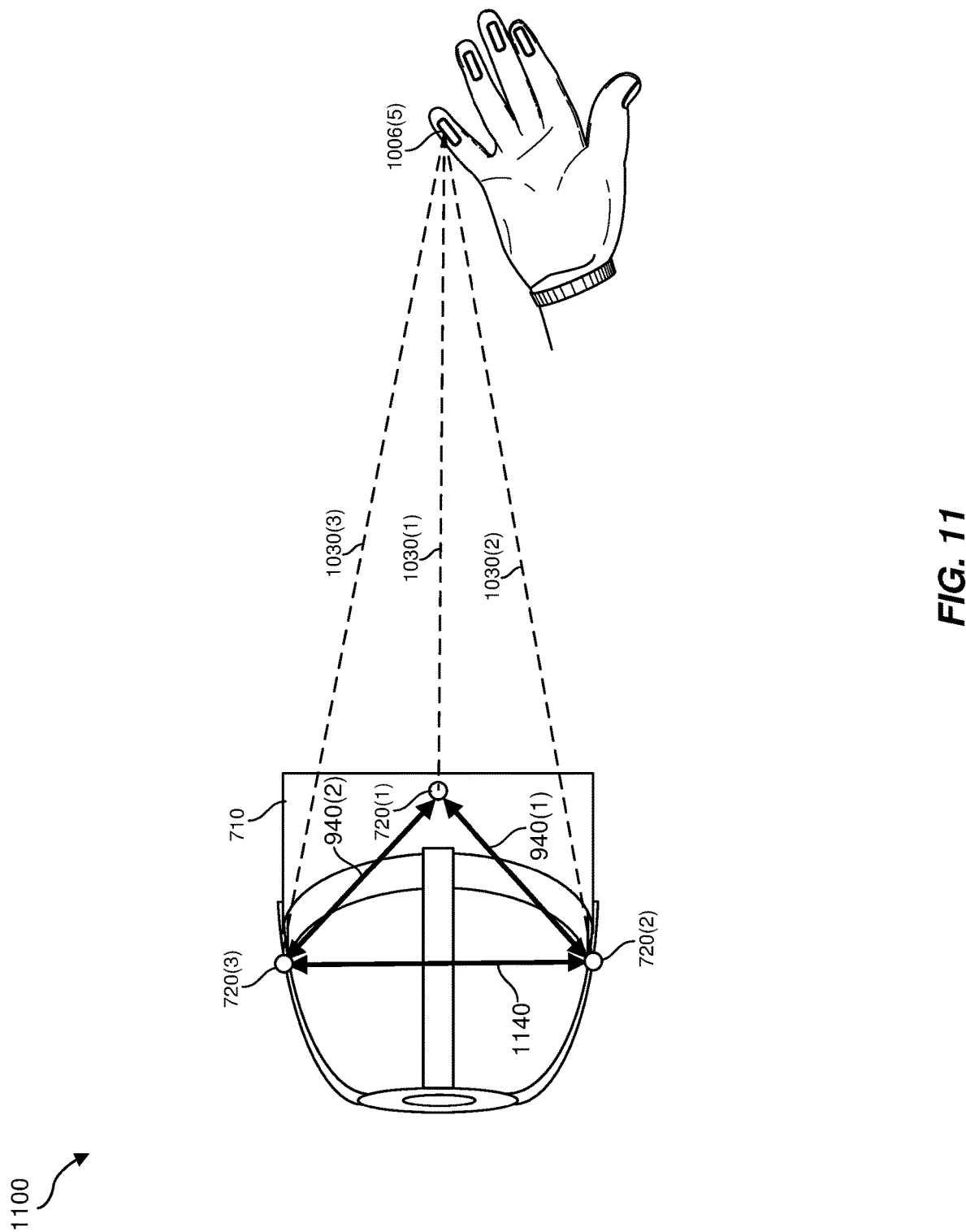
FIG. 11 is an illustration that depicts certain exemplary principles of operation of radar-based artificial reality tracking.

FIG. 11 illustrates a top-down perspective of an exemplary artificial reality system 1100 that includes wearable device 710 and transponder 1006(5) worn by a user. As illustrated in FIG. 10, wearable device 710 may include and/or incorporate radar devices 720(1)-(3). In some examples, radar device 720(1) may be situated proximate to the user's forehead and/or the top of the user's head on wearable device 710. In such examples, radar device 720(2) may be situated proximate to the user's right ear on wearable device 710. In addition, radar device 720(3) may be situated proximate to the user's left ear on wearable device 710.

In some examples, radar device 720(1) may be separated from both of radar devices 720(2) and 720(3) by known distance 940. In addition, radar devices 720(2) and 730(3) may be separated from each other by a known distance 1140. In such examples, some of radar devices 720(1)-(3) may be non-coplanar and/or non-colinear (e.g., not aligned) with one another on wearable device 710. This non-coplanarity and/or non-collinearity of some of radar devices 720(1)-(3) may enable processing device 802 of wearable device 710 to unambiguously calculate and/or determine the three-dimensional location of transponder 1006(5) relative to wearable device 710 by way of triangulation and/or trigonometry.

In some examples, radar devices 720(1)-(3) may each detect and/or receive a returned signal from transponder 1006(5). For example, radar device 720(1) may receive returned signal 1030(1) from transponder 1006(5). Similarly, radar device 720(2) may receive returned signal 1030(2) from transponder 1006(5). In addition, radar device 720(3) may receive returned signal 1030(3) from transponder 1006(5).

The three-dimensional location of transponder 1006(5) may be calculated and/or determined in a variety of different ways. In some examples, processing device 802 of wearable device 710 may be able to calculate and/or determine the three-dimensional location of transponder 1006(5) by way of triangulation and/or trigonometry. As a specific example, radar device 720(1) may transmit a frequency-modulated radar signal to transponder 1006(5). In this example, the frequency of this radar signal may vary within the range of 120 gigahertz to 130 gigahertz over time. More specifically, this radar signal may follow a frequency model that is linear with time. For example, this radar signal may sweep from 120 gigahertz to 130 gigahertz over 1 millisecond. In this example, the radar signal may also sweep back from 130 gigahertz to 120 gigahertz over 1 millisecond. Accordingly, this radar signal's frequency may change 1 gigahertz every 100 microseconds. Put another way, this radar signal may have a frequency sweep of 10 gigahertz per millisecond.

Continuing with this example, radar device 720(1) may receive returned signal 1030(1) from transponder 1006(5) in response to the transmitted frequency-modulated radar signal. In this example, as radar device 720(1) receives the returned signal from transponder 1006(5), processing device 802 may identify the transponder from the modulation frequency of the return signal induced by the transponder. Upon processing the received signal, radar device 720(1) passes the received signal to the processing device 802, which then determines the distance from radar device 720(1) to the transponder from the sideband frequencies of the known modulation frequency of the transponder.

In one example, the distance between transponder 1006(5) and radar device 720(1) may be calculated and/or accurately estimated by the following formula:

$$\text{distance} = \frac{\text{speed of light} \times \text{beat frequency}}{2 \times \text{frequency sweep}}.$$

This beat frequency may include and/or represent the sideband frequency around the known modulation frequency of the transponder. For instance, if the modulation frequency used by transponder 1006(5) is $f_m$, the radar processed return signal in absence of noise includes and/or represents two harmonics at frequencies $f_m \mp f_b$, where $f_b$ is the beat frequency appearing in the previous formula. Other embodiments of such a formula may account for certain real-world offsets, compensations, and/or processing delays that potentially affect the travel time of the transmission and/or returned signals. Processing device 802 may calculate and/or accurately estimate the distance between transponder 1006(5) and radar device 720(1) by applying the beat frequency of returned signal 1030(1) to that formula $$\left( e.g., \text{distance} = \frac{\left(1.18 \times 10^{10} \frac{\text{inches}}{\text{second}}\right) \times (61,020 \text{ hertz})}{2 \times \left(1 \times 10^{13} \frac{\text{hertz}}{\text{second}}\right)} \approx 36 \text{ inches} \right).$$

In this example, the distances between transponder 1006(5) and radar devices 720(2) and 720(3) may be calculated and/or accurately estimated in the same way. For example, processing device 802 may calculate the beat frequency of returned signal 1030(2) as 67,800 hertz and the beat frequency of returned signal 1030(3) as 69,495 hertz. Accordingly, processing device 802 may calculate and/or accurately estimate the distance between transponder 1006(5) and radar device 720(2) by applying the beat frequency of returned signal 1030(2) to that formula (e.g., $$\text{distance} = \frac{\left(1.18 \times 10^{10} \frac{\text{inches}}{\text{second}}\right) \times (67,800 \text{ hertz})}{2 \times \left(1 \times 10^{13} \frac{\text{hertz}}{\text{second}}\right)} \approx 40 \text{ inches}.$$

Similarly, processing device 802 may calculate and/or accurately estimate the distance between transponder 1006(5) and radar device 720(3) by applying the beat frequency of returned signal 1030(3) to that formula (e.g., $$\text{distance} = \left( \frac{\left(1.18 \times 10^{10} \frac{\text{inches}}{\text{second}}\right) \times (69{,}495 \text{ hertz})}{2 \times \left(1 \times 10^{13} \frac{\text{hertz}}{\text{second}}\right)} \approx 41 \text{ inches} \right).$$

In some examples, these distances between radar devices 720(1)-(3) and transponder 1006(5) may represent and/or correspond to a three-dimensional location of transponder 1006(5) relative to wearable device 710. For example, processing device 802 may be able to access known distance 940(1) between radar devices 720(1) and 720(2), known distance 940(2) between radar devices 720(1) and 720(3), and/or known distance 1140 between radar devices 720(2) and 720(3). With these known distances and the calculated distances between transponder 1006(5) and radar devices 720(1)-(3), processing device 802 may map and/or track transponder 1006(5) within and/or across three-dimensional space relative to wearable device 710.

In some examples, upon determining and/or calculating the distance between one of radar devices 720(1)-(3) and transponder 1006(5), processing device 802 may generate an input command for artificial reality system 1100 based at least in part on that distance. In one example, the input command may account for the distance between that radar device and transponder 1006(5) and facilitate modifying at least one virtual component of artificial reality system 1100 to account for that distance. For example, processing device 802 may facilitate modifying at least one virtual component of artificial reality system 1100 in accordance with the input command to account for the distance between that radar device and transponder 1006(5).

Additionally or alternatively, upon determining the three-dimensional location of transponder 1006(1) relative to wearable device 710, processing device 802 may generate an input command for artificial reality system 1100 based at least in part on that three-dimensional location. In one example, the input command may account for the three-dimensional location of transponder 1006(5) and facilitate modifying at least one virtual component of artificial reality system 1100 to account for that three-dimensional location. For example, processing device 802 may facilitate modifying at least one virtual component of artificial reality system 1100 in accordance with the input command to account for the distance between that radar device and transponder 1006(5).

Processing device 802 may facilitate such modifications in a variety of different ways and contexts. For example, processing device 802 may send a message to the display within wearable device 710 of artificial reality system 1100. Examples of this message include, without limitation, commands, computer-readable instructions, information and/or data indicative of the distance between the radar device and the transponder, information and/or data indicative of the three-dimensional location of the transponder relative to the wearable device, combinations or variations of one or more of the same, and/or any other suitable message.

Figure 12:
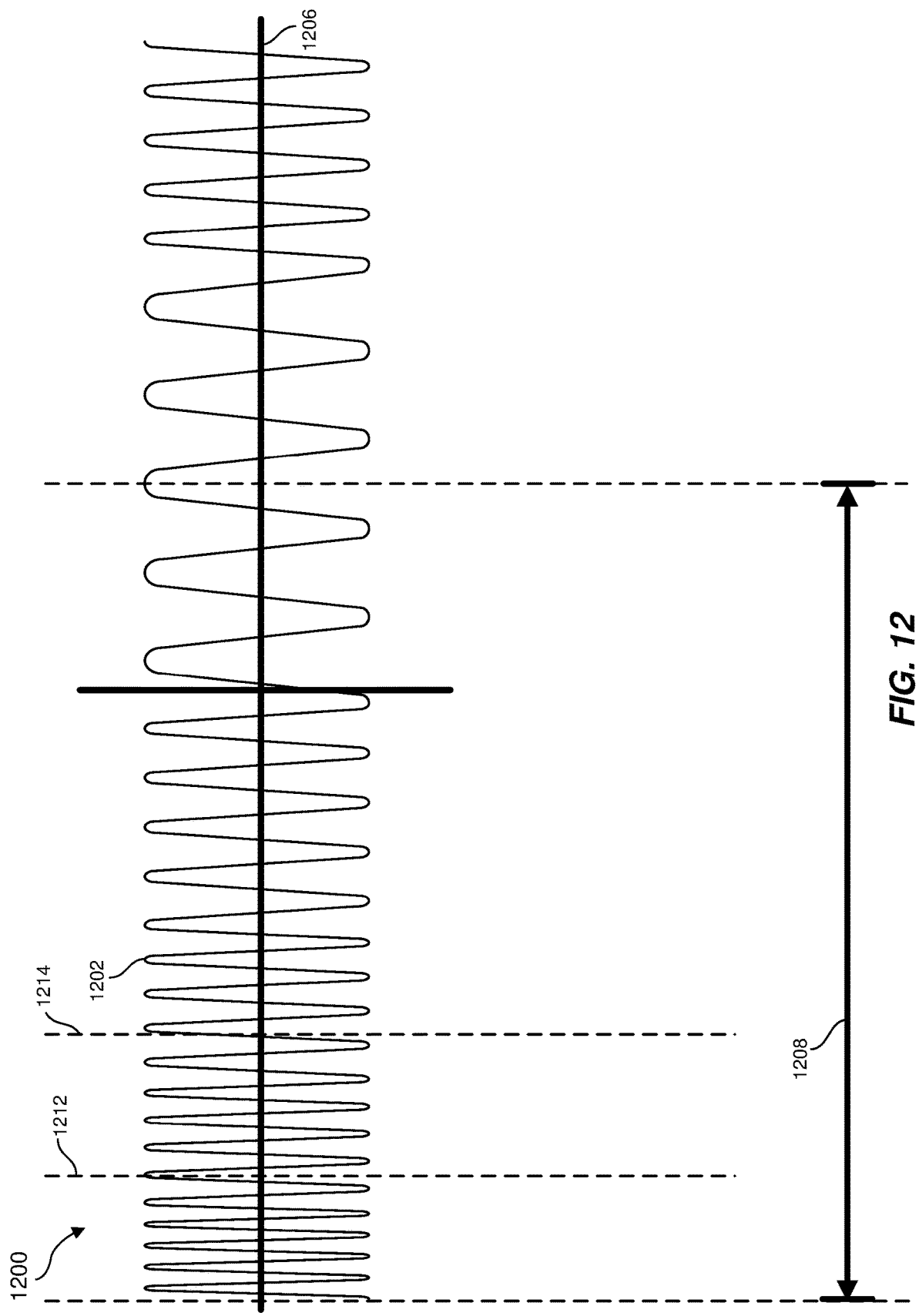
FIG. 12 is an illustration of an exemplary frequency-modulated radar signal used in connection with radar-based artificial reality tracking.

FIG. 12 illustrates an exemplary frequency sweep 1200 that represents and/or follows a frequency model that is linear with time. As illustrated in FIG. 12, frequency sweep 1200 may represent and/or involve a frequency-modulated radar signal 1202 whose frequency changes linearly with and/or over time 1206. Although frequency sweep 1200 in FIG. 12 is intended to demonstrate an exemplary frequency model, the frequency changes illustrated in FIG. 12 may not be accurately depicted to scale and/or time.

In frequency sweep 1200, frequency-modulated radar signal 1202 may sweep from 130 gigahertz to 120 gigahertz over a period 1208. In one example, period 1208 may represent and/or correspond to a 1-millisecond time interval. Accordingly, in this example, frequency sweep 1200 may represent and/or amount to a linear 10-gigahertz per millisecond change and/or variation in radar signal 1202.

In one example, processing device 802 may detect and/or calculate a beat frequency in connection with a returned signal that arrived at radar device 720(1) from transponder 1006(1). For example, processing device 802 may determine that the returned signal arrived at a specific point in time with a frequency 1212. In this example, processing device 802 may also determine that at that specific point in time the radar transmission emitted by radar device 720(1) to transponder 1006(1) has a frequency 1214. Processing device 802 may then calculate and/or determine beat frequency of the returned signal by identifying the absolute value of the difference between frequency 1212 and frequency 1214.

Three-dimensional mapping and/or tracking may be performed in a variety of different ways. In some examples, returning to FIG. 11, one of radar devices 720(1)-(3) may transmit a frequency-modulated radar signal to transponder 1006(5). In response to this frequency-modulated radar signal from one of radar devices 720(1)-(3), transponder 1006(5) may form a returned signal that is returned to all of radar devices 720(1)-(N). For example, returned signals 1030(1)-(3) in FIG. 11 may all represent the same returned as detected and/or received by radar devices 720(1)-(3). In this example, processing device 802 may calculate the various distances between each of radar devices 720(1)-(3) and transponder 1006(5) based at least in part on the frequencies of returned signals 1030(1)-(3) as detected and/or received by radar devices 720(1)-(3), respectively. Additionally or alternatively, processing device 802 may determine the three-dimensional location of transponder 1006(5) relative to wearable device 710 based at least in part on those various distances.

In other examples, processing device 802 may direct each of radar devices 720(1)-(3) to transmit a separate frequency-modulated radar signal to transponder 1006(5). In response to each frequency-modulated radar signal received from one of radar devices 720(1)-(3), transponder 1006(5) may form a separate returned signal that is returned to the corresponding radar device. For example, transponder 1006(5) may form returned signal 1030(1) in FIG. 11 in response to the frequency-modulated radar signal received from radar device 720(1). Similarly, transponder 1006(5) may form returned signal 1030(2) in FIG. 11 in response to the frequency-modulated radar signal received from radar device 720(2). Finally, transponder 1006(5) may form returned signal 1030(3) in FIG. 11 in response to the frequency-modulated radar signal received from radar device 720(3). In this example, processing device 802 may calculate the various distances between each of radar devices 720(1)-(3) and transponder 1006(5) based at least in part on the frequencies of returned signals 1030(1)-(3) as detected and/or received by radar devices 720(1)-(3). Additionally or alternatively, processing device 802 may determine the three-dimensional location of transponder 1006(5) relative to wearable device 710 based at least in part on those various distances.

In some examples, the transponder may be secured to a wearable accessory worn by a specific body part of the user. In such examples, processing device 802 may detect and/or determine changes in position of that body part based at least in part on the distance between one or more of radar devices 720(1)-(3) and the transponder. Examples of such a body part of the user include, without limitation, a fingertip, a finger joint, a knuckle, a wrist, a shoulder, a palm, a back of hand, a foot, variations or combinations of one or more of the same, and/or any other suitable body part of the user.

In some examples, one or more transponders may be secured to stationary locations within the physical environment of the user. As will be described in greater detail below, these transponders may enable processing device 802 to determine and/or calculate a three-dimensional position (e.g., location and/or orientation) of wearable device 710 relative to the transponders.

Figure 13:
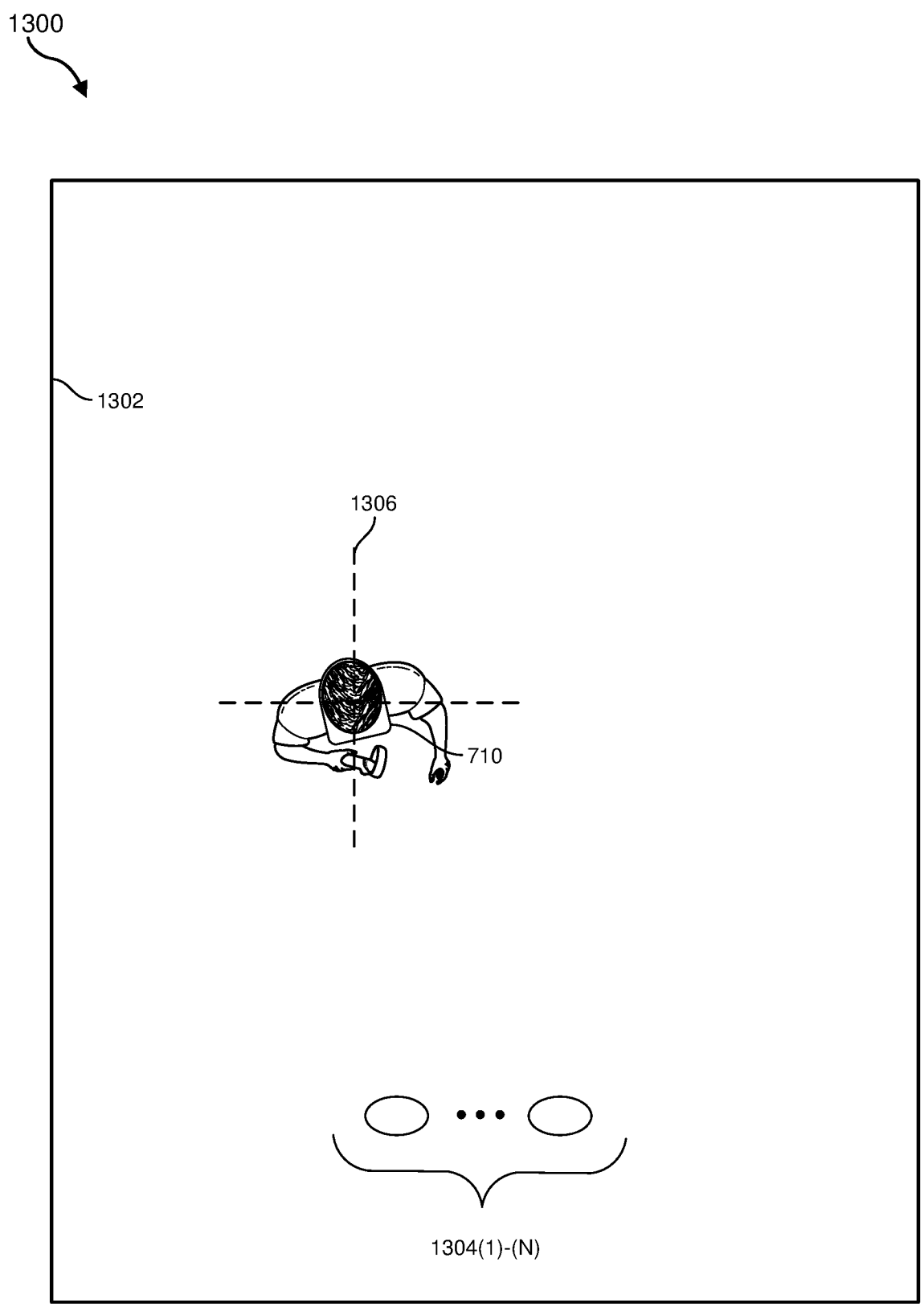
FIG. 13 is an illustration of an exemplary artificial reality system that includes a wearable device for radar-based artificial reality tracking.

FIG. 13 illustrates an exemplary artificial reality system 1300 that includes wearable device 710 and one or more radiocommunications devices 1304(1)-(N). As illustrated in FIG. 13, radiocommunications devices 1304(1)-(N) may be secured and/or positioned at stationary locations throughout a physical environment 1302 of a user donning wearable device 710. In some examples, radiocommunications devices 1304(1)-(N) may include and/or represent an array of transponders that repeat and/or retransmit radar signals back to radar devices incorporated into wearable device 710. In other examples, radiocommunications devices 1304(1)-(N) may include and/or represent an array of radar devices that operate and/or function in any of the ways described above in connection with radar devices 720(1)-(3).

In some examples, the radar devices incorporated into wearable device 710 may transmit frequency-modulated radar signals to radiocommunications devices 1304(1)-(N). In one example, radiocommunications devices 1304(1)-(N) may receive the frequency-modulated radar signal and form a returned signal by performing frequency shifting on the frequency-modulated radar signal. Radiocommunications devices 1304(1)-(N) may then transmit the returned signal back to the radar devices incorporated into wearable device 710.

As the radar devices receive the returned signals from radiocommunications devices 1304(1)-(N), processing device 802 of wearable device 710 may determine and/or identify the frequencies of those returned signals and/or compensate for the frequency shifting performed by radiocommunications devices 1304(1)-(N). For example, processing device 802 may remove known frequency offsets from the returned signals. Processing device 802 may then determine and/or calculate the distances between the radar devices incorporated into wearable 710.

In one example, processing device 802 may determine and/or calculate a change in position of the user donning wearable device 710 based at least in part on those distances between the radar devices incorporated into wearable 710. Additionally or alternatively, processing device 802 may determine and/or calculate a three-dimensional position 1306 of wearable device 710 relative to the radiocommunications devices 1304(1)-(N) based at least in part on those distances between the radar devices incorporated into wearable 710. In this example, three-dimensional position 1306 may include and/or represent the three-dimensional location and/or orientation of wearable device 710 relative to the radiocommunications devices 1304(1)-(N).

In some examples, processing device 802 may map three-dimensional position 1306 of wearable device 710 to physical environment 1302. This mapping may facilitate and/or correspond to a remote and/or outside view of the user donning wearable device 710 within physical environment. In one example, the user donning wearable device 710 may be engaged in an interactive artificial reality application (such as a virtual room-sharing application and/or a video conferencing application) with another user operating an artificial reality system at a remote location. In this example, processing device 802 may provide the remote and/or outside view of the user donning wearable device 710 to the other user via the interactive artificial reality application.

Figure 14:
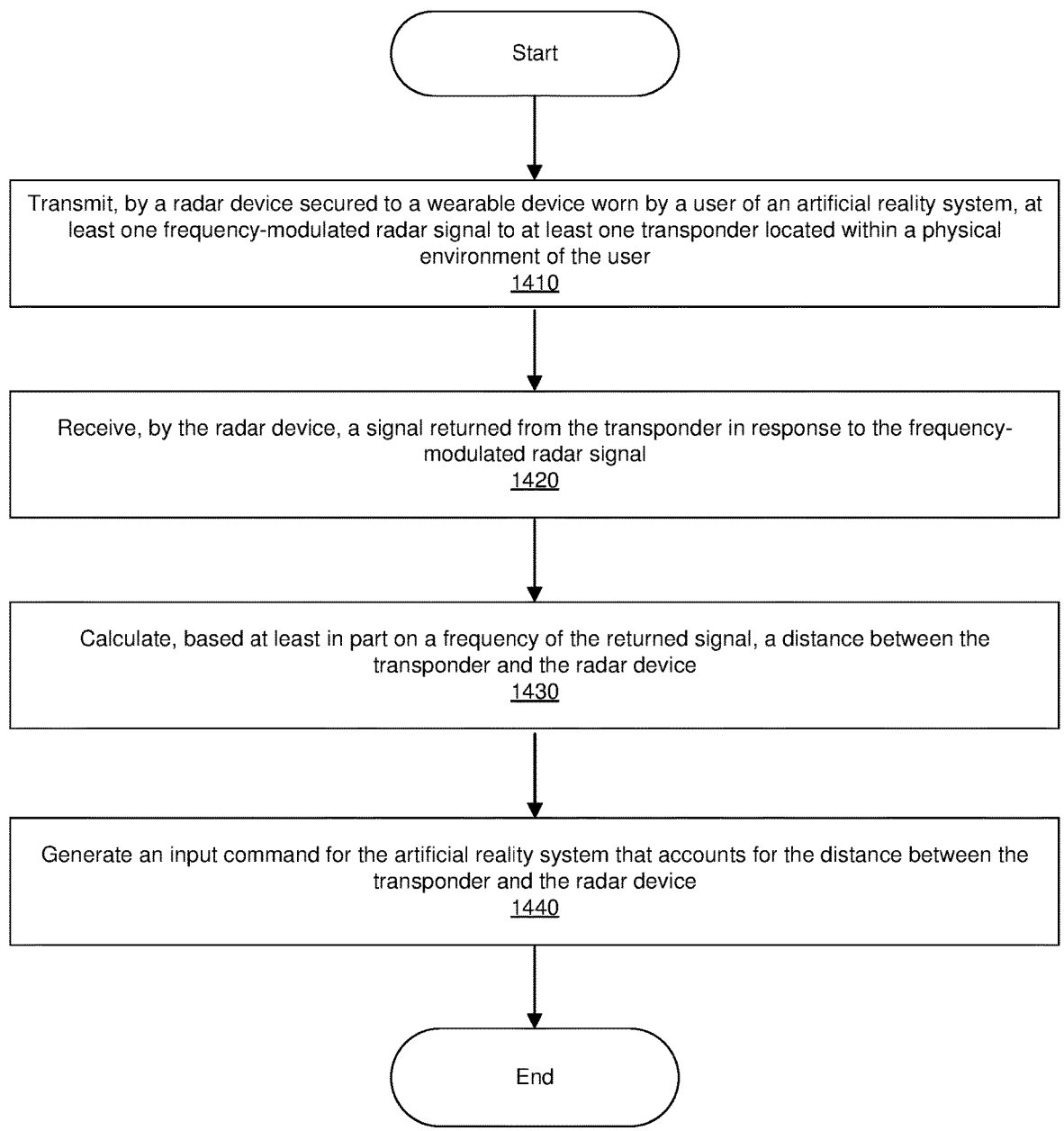
FIG. 14 is a flow diagram of an exemplary method for radar-based artificial reality tracking.

FIG. 14 is a flow diagram of an exemplary method 1400 for radar-based tracking of artificial reality users. The steps shown in FIG. 14 may be performed by certain devices incorporated into a wearable of an artificial reality system. Moreover, the steps shown in FIG. 14 may also incorporate and/or involve various sub-steps and/or variations consistent with the descriptions provided above in connection with FIGS. 7-13.

As illustrated in FIG. 14, at step 1410, a radar device secured to a wearable device worn by a user of artificial reality system may transmit at least one frequency-modulated radar signal to at least one transponder located within a physical environment of the user. For example, radar device 720(3) may transmit frequency-modulated radar signal 1020 to transponder 1006(2) secured to wearable accessory 1004(2) worn by a user of artificial reality system 1000 in FIG. 10. In this example, frequency-modulated radar signal 1020 may be modulated according to a frequency model that is linear with time.

At step 1420 in FIG. 14, the radar device may receive a signal returned from the transponder in response to the frequency-modulated radar signal. For example, radar device 720(3) may receive returned signal 1030 from transponder 1006(2) in response to frequency-modulated radar signal 1020. In one example, returned signal 1030 may represent and/or amount to a frequency shifted version of frequency-modulated radar signal 1020 achieved through modulation by the harmonic of a known frequency. In another example, returned signal 1030 may simply be relayed and/or retransmitted by transponder 1006(2) without any form of frequency shifting.

At step 1430 in FIG. 14, a processing device may calculate the distance between the transponder and the radar device based at least in part on the frequency of the returned signal. For example, processing device 802 may calculate the distance between transponder 1006(2) and radar device 720(3) based at least in part on the frequency of returned signal 1030. In one example, processing device 802 may determine the beat frequency of returned signal 1030, which appears as sidelobes of the known modulation frequency of transponder 1006(2). In this example, processing device 802 may apply the determined beat frequency to a variation of the following formula:

$$\text{distance} = \frac{\text{speed of light} \times \text{beat frequency}}{2 \times \text{frequency sweep}}.$$

At step 1440 in FIG. 14, the processing device may generate an input command for the artificial reality system that accounts for the distance between the transponder and the radar device. For example, processing device 802 may generate an input command for artificial reality system 1000 in FIG. 10 that accounts for the distance between transponder 1006(2) and radar device 720(3). In one example, the input command may facilitate modifying at least one virtual component of artificial reality system 1100 to account for that distance, thereby altering the user's artificial reality experience.

As described above in connection with FIGS. 7-14, the disclosed radar systems may utilize various types of radar to track changes in the position, orientation, and/or physical location of a wearable artificial reality device and/or a user of an artificial reality system. For example, the disclosed systems may utilize FMCW radar that transmits a frequency-modulated signal (e.g., a signal that sweeps between a certain range of frequencies). In one embodiment, the frequency of an FMCW signal may vary linearly over a fixed period of time.

After transmitting an FMCW signal, the radar system may receive a reflected, echoed, and/or otherwise returned signal from a target that received and/or encountered the FMCW signal. The radar system may then determine the range of (e.g., distance to) the target based at least in part on a frequency shift or difference of the returned signal. Specifically, the radar system may combine (e.g., multiply) the returned signal and the FMCW transmission signal (which may be referred to as a reference signal). The radar system may then determine the frequency components of the combined signal. The frequency components may include a difference frequency sometimes referred to as a beat frequency.

In some embodiments, the value of the beat frequency may be directly proportional to the distance to the target. For example, the transmitted frequency may have an approximately linear variation with time (e.g., increasing or decreasing with time). For example, the frequency modulation may have a triangular or sawtooth variation with time. In some examples, the radar system may transmit a radar signal at an initial transmission frequency. The radar signal may then be incident on a transponder or other object in the environment and then be reflected or otherwise redirected back to the radar system.

In some examples, the radar system may include a receiver circuit with a mixer that mixes the received signal (e.g., at the initial transmission frequency) with the prescribed value of the shifting frequency. As the transmission frequency varies as a known function with time, the difference frequency may also be a function of time (e.g., the time taken for the radar signal to travel to the object and back again). The difference frequency may be based on and/or approximately linearly related to the time taken by the radar signal to reach the object in the environment and then be returned to the receiver. The distance to the object may then be determined using the speed of electromagnetic radiation (in air, this speed may be approximated to the speed of light in a vacuum).

In some examples, a transponder may return the received signal with a certain offset frequency. A mixer may then mix the received signal with a similarly offset transmission frequency. The offset frequency may be larger than a typical beat frequency, allowing the offset frequency to be determined and used to identify the transponder (e.g. to identify the transponder from two or more transponders in a system). Using the beat frequency of the returned signal, the disclosed radar systems may determine the range of various targets (including, e.g., transponders secured to the body of a user) and/or the three-dimensional positions of such targets. The range and/or positioning of these targets may then be used to modify and/or alter the artificial reality experience of a user of an artificial reality system.

Example Embodiments

In some embodiments, a radar system may include a wearable device dimensioned to be worn by a user of an artificial reality system. The radar system may also include at least one radar device that is secured to the wearable device. This radar device may transmit at least one frequency-modulated radar signal to at least one transponder located within a physical environment of the user. The radar system may further include at least one processing device communicatively coupled to the radar device. The processing device may detect a signal returned to the radar device from the transponder in response to the frequency-modulated radar signal. The processing device may also calculate a distance between the transponder and the radar device based at least in part on a frequency of the returned signal.

In some examples, the radar device may include a plurality of radar devices secured to the wearable device such that each of the plurality of radar devices are separated by at least a certain distance. In one example, the plurality of radar devices may each receive the signal returned from the transponder in response to the frequency-modulated radar signal. In this example, the processing device may detect a frequency of the returned signal at each of the plurality of radar devices in response to the frequency-modulated radar signal. The processing device may then determine a three-dimensional location of the transponder relative to the wearable device based at least in part on a frequency analysis of the returned signal as received at each of the plurality of radar devices.

In some examples, the processing device may direct each of the plurality of radar devices to transmit the frequency-modulated radar signal to the transponder. In such examples, the processing device may detect a plurality of distinct signals returned by the transponder in response to the frequency-modulated radar signal transmitted by each of the plurality of radar devices. The processing device may then determine a three-dimensional location of the transponder relative to the wearable device based at least in part on a frequency analysis of the plurality of distinct signals returned by the transponder.

In some examples, the transponder may be secured at a stationary location within the physical environment of the user. In such examples, the plurality of radar devices may each receive the signal returned from the transponder secured at the stationary location in response to the frequency-modulated radar signal. In one example, the processing device may detect a frequency of the returned signal at each of the plurality of radar devices in response to the frequency-modulated radar signal. The processing device may then determine a three-dimensional position of the wearable device relative to the transponder based at least in part on a frequency analysis of the returned signal as received at each of the plurality of radar devices.

In some examples, the transponder comprises a plurality of transponders that are secured at a plurality of stationary locations throughout the physical environment of the user. In such examples, the processing device facilitates providing, via an interactive artificial reality application, a remote view of the user to an additional user of an additional artificial reality system based at least in part on the three-dimensional position of the wearable device relative to the plurality of transponders.

In some examples, the plurality of radar devices may be secured to the wearable device such that at least some of the radar devices are non-coplanar with one another on the wearable device. In one example, the plurality of radar devices may include a first radar device that is situated, on the wearable device, proximate to a left ear of the user. In this example, the plurality of radar devices may include a second radar device that is situated, on the wearable device, proximate to a right ear of the user. Additionally or alternatively, the plurality of radar devices may include a third radar device that is situated, on the wearable device, proximate to a top of the user's head.

In some examples, the transponder may be secured to a wearable accessory worn by a specific body part of the user. In such examples, the processing device may determine a change in position of the specific body part of the user based at least in part on the distance between the transponder and the radar device.

In some examples, the transponder may be secured at a stationary location within the physical environment of the user. In such examples, the processing device may determine a change in position of the user relative to the stationary location based at least in part on the distance between the transponder and the radar device.

In some examples, the transponder may form the returned signal by shifting the frequency-modulated radar signal by a certain amount of frequency to enable the processing device to accurately measure the distance between the transponder and the radar device even when the transponder is located within a minimum distance threshold of the radar device. This minimum distance threshold may be outside a detection range of the radar device. The processing device may then compensate for the certain amount of frequency when calculating the distance between the transponder and the radar device.

In some examples, the radar device may modulate the frequency-modulated radar signal according to a frequency model that is linear with time. In such examples, the processing device may calculate the distance between the transponder and the radar device by determining a beat frequency of the returned signal, multiplying the beat frequency by a speed of light approximation, identifying a frequency sweep of the frequency model, and then dividing a product of the beat frequency and the speed of light approximation by twice the frequency sweep of the frequency model.

In some examples, the transponder may include a plurality of active transponders that are each configured to perform frequency shifting on incoming frequency-modulated radar signals. In such examples, the radar device may transmit the frequency-modulated radar signal to each of the plurality of active transponders. The radar device may then receive, from a first active transponder within the plurality of active transponders, a first returned signal whose frequency has been shifted a first amount of frequency by the first active transponder. The radar device may also receive, from a second active transponder within the plurality of active transponders, a second returned signal whose frequency has been shifted a second amount of frequency by the second active transponder.

Continuing with such examples, the processing device may calculate a distance between the first active transponder and the radar device based at least in part on the frequency of the first returned signal. The processing device may also calculate a distance between the second active transponder and the radar device based at least in part on the frequency of the second returned signal. The processing device may distinguish between the first active transponder and the second active transponder based at least in part on the first amount of frequency shifted by the first active transponder and the second amount of frequency shifted by the second active transponder.

In some examples, the plurality of transponders may be configured to operate on separate communication channels such that each of the plurality of transponders is tuned to retransmit only incoming frequency-modulated radar signals of a specific frequency. In such examples, the radar device may include a plurality of radar devices that are configured to operate on the separate communication channels such that each of the plurality of radar devices are paired to only one of the plurality of transponders by way of the specific frequency.

In some examples, the radar system may also include at least one additional radar device that is secured at a stationary location within the physical environment of the user. The additional radar system may transmit at least one additional frequency-modulated radar signal toward the user. In one example, the radar system may further include at least one additional processing device communicatively coupled to the additional radar device. In this example, the additional processing device may detect an additional signal returned to the additional radar device from the user in response to the additional frequency-modulated radar signal. The additional processing device may calculate a distance between the user and the additional radar device based at least in part on a frequency of the additional returned signal. The additional processing device may then facilitate providing, via an artificial reality application, an outside view of the user to the user of the artificial reality system or an additional user of an additional artificial reality system based at least in part on the distance between the user and the additional radar device within the physical environment of the user.

In some examples, the processing device may generate an input command for the artificial reality system that accounts for the distance between the transponder and the radar device. In such examples, the processing device may facilitate modifying at least one virtual component of the artificial reality system in accordance with the input command to account for the distance between the transponder and the radar device.

A corresponding artificial reality system may include a wearable device dimensioned to be worn by a user of an artificial reality system. The artificial reality system may also include at least one radar device that is secured to the wearable device. This radar device may transmit at least one frequency-modulated radar signal to at least one transponder located within a physical environment of the user. The artificial reality system may further include at least one processing device communicatively coupled to the radar device. The processing device may detect a signal returned to the radar device from the transponder in response to the frequency-modulated radar signal. The processing device may also calculate a distance between the transponder and the radar device based at least in part on a frequency of the returned signal.

A corresponding method may include (1) transmitting, by a radar device secured to a wearable device worn by a user of an artificial reality system, at least one frequency-modulated radar signal to at least one transponder located within a physical environment of the user, (2) receiving, by the radar device, a signal returned from the transponder in response to the frequency-modulated radar signal, (3) calculating, based at least in part on a frequency of the returned signal, a distance between the transponder and the radar device, and then (4) generating an input command for the artificial reality system that accounts for the distance between the transponder and the radar device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A radar system comprising:
a wearable device dimensioned to be worn by a user of an artificial reality system;
a plurality of radar devices that:
are secured to the wearable device; and
are separated by at least a certain distance, wherein:
at least one of the plurality of radar devices transmits at least one frequency-modulated radar signal to at least one transponder located within a physical environment of the user; and
the plurality of radar devices each receive a signal returned from the transponder in response to the frequency-modulated radar signal;
at least one processing device communicatively coupled to the plurality of radar devices, wherein the processing device:
detects a frequency of the returned signal at each of the plurality of radar devices in response to the frequency-modulated radar signal; and
determines, based at least in part on a frequency analysis of the returned signal as received at each of the plurality of radar devices, a three-dimensional location of the transponder relative to the wearable device.

2. The radar system of claim 1, wherein the processing device:
directs each of the plurality of radar devices to transmit the frequency-modulated radar signal to the transponder;
detects a plurality of distinct signals returned by the transponder in response to the frequency-modulated radar signal transmitted by each of the plurality of radar devices; and
determines, based at least in part on a frequency analysis of the plurality of distinct signals returned by the transponder, the three-dimensional location of the transponder relative to the wearable device.

3. The radar system of claim 1, wherein:
the transponder is secured at a stationary location within the physical environment of the user;
the plurality of radar devices each receive the signal returned from the transponder secured at the stationary location in response to the frequency-modulated radar signal; and
the processing device:
determines, based at least in part on the frequency analysis of the returned signal as received at each of the plurality of radar devices, the three-dimensional position of the wearable device relative to the transponder secured at the stationary location within the physical environment of the user.

4. The radar system of claim 3, wherein:
the transponder comprises a plurality of transponders that are secured at a plurality of stationary locations throughout the physical environment of the user; and
the processing device facilitates providing, via an interactive artificial reality application, a remote view of the user to an additional user of an additional artificial reality system based at least in part on the three-dimensional position of the wearable device relative to the plurality of transponders.

5. The radar system of claim 1, wherein the plurality of radar devices are secured to the wearable device such that at least some of the radar devices are non-colinear with one another on the wearable device.

6. The radar system of claim 1, wherein the plurality of radar devices comprise:
a first radar device that is situated, on the wearable device, proximate to a left ear of the user;
a second radar device that is situated, on the wearable device, proximate to a right ear of the user; and
a third radar device that is situated, on the wearable device, proximate to a top of the user's head.

7. The radar system of claim 1, wherein:
the transponder is secured to a wearable accessory worn by a specific body part of the user; and
the processing device determines, based at least in part on the three-dimensional location of the transponder relative to the wearable device, a change in position of the specific body part of the user within the physical environment of the user.

8. The radar system of claim 1, wherein:
the transponder is secured at a stationary location within the physical environment of the user; and
the processing device determines, based at least in part on the three-dimensional location of the transponder relative to the wearable device, a change in position of the user relative to the stationary location.

9. The radar system of claim 1, wherein:
the transponder forms the returned signal by shifting the frequency-modulated radar signal by a certain amount of frequency to enable the processing device to accurately measure the three-dimensional location of the transponder relative to the wearable device even when the transponder is located within a minimum distance threshold of the plurality of radar devices, wherein the minimum distance threshold is outside a detection range of the plurality of radar devices; and
the processing device compensates for the certain amount of frequency when determining the three-dimensional location of the transponder relative to the wearable device.

10. The radar system of claim 1, wherein:
the at least one of the plurality of radar devices generates the frequency-modulated radar signal according to a frequency model that is linear with time; and
the processing device determines the three-dimensional location of the transponder relative to the wearable device by:
determining a beat frequency of the returned signal;
multiplying the beat frequency by a speed of light approximation;
identifying a frequency sweep of the frequency model; and
dividing a product of the beat frequency and the speed of light approximation by twice the frequency sweep of the frequency model.

11. The radar system of claim 1, wherein:
the transponder comprises a plurality of active transponders that are each configured to perform frequency shifting on incoming frequency-modulated radar signals;
the at least one of the plurality of radar devices transmits the frequency-modulated radar signal to each of the plurality of active transponders; and
the plurality of radar devices each:
receive, from a first active transponder within the plurality of active transponders, a first returned signal whose frequency has been shifted a first amount of frequency by the first active transponder;
receiver, from a second active transponder within the plurality of active transponders, a second returned signal whose frequency has been shifted a second amount of frequency by the second active transponder;
the processing device:
calculates, based at least in part on the frequency of the first returned signal, a distance between the first active transponder and the wearable device;
calculates, based at least in part on the frequency of the second returned signal, a distance between the second active transponder and the wearable device; and
distinguishes between the first active transponder and the second active transponder based at least in part on the first amount of frequency shifted by the first active transponder and the second amount of frequency shifted by the second active transponder.

12. The radar system of claim 11, wherein:
the plurality of transponders are configured to operate on separate communication channels such that each of the plurality of transponders is tuned to retransmit only incoming frequency-modulated radar signals of a specific frequency range; and
the plurality of radar devices that are configured to operate on the separate communication channels such that each of the plurality of radar devices are paired to only one of the plurality of transponders by way of the specific frequency range.

13. The radar system of claim 1, further comprising at least one additional radar device that:
is secured at a stationary location within the physical environment of the user; and
transmits at least one additional frequency-modulated radar signal toward the user;
at least one additional processing device communicatively coupled to the additional radar device, wherein the additional processing device:
detects an additional signal returned to the additional radar device from the user in response to the additional frequency-modulated radar signal;
calculates, based at least in part on a frequency of the additional returned signal, a distance between the user and the additional radar device within the physical environment of the user; and
facilitates providing, via an artificial reality application, an outside view of the user to the user of the artificial reality system or an additional user of an additional artificial reality system based at least in part on the distance between the user and the additional radar device within the physical environment of the user.

14. The radar system of claim 1, wherein the processing device generates an input command for the artificial reality system that accounts for the three-dimensional location of the transponder relative to the wearable device.

15. The radar system of claim 14, wherein the processing device facilitates modifying at least one virtual component of the artificial reality system in accordance with the input command to account for the three-dimensional location of the transponder relative to the wearable device.

16. An artificial reality system comprising:
a wearable device dimensioned to be worn by a user of the artificial reality system;
a plurality of radar devices that:
are secured to the wearable device; and
are separated by at least a certain distance, wherein:
at least one of the plurality of radar devices transmits at least one frequency-modulated radar signal to at least one transponder located within a physical environment of the user; and
the plurality of radar devices each receive a signal returned from the transponder in response to the frequency-modulated radar signal;
at least one processing device communicatively coupled to the plurality of radar devices, wherein the processing device:
detects a frequency of the returned signal at each of the plurality of radar devices in response to the frequency-modulated radar signal; and
determines, based at least in part on a frequency analysis of the returned signal as received at each of the plurality of radar devices, a three-dimensional location of the transponder relative to the wearable device.

17. A method comprising:
transmitting, by at least one of a plurality of radar devices secured to a wearable device worn by a user of an artificial reality system, at least one frequency-modulated radar signal to at least one transponder located within a physical environment of the user;
receiving, by each of the plurality of radar devices, a signal returned from the transponder in response to the frequency-modulated radar signal;
detecting a frequency of the returned signal at each of the plurality of radar devices in response to the frequency-modulated radar signal;
determining, based at least in part on a frequency analysis of the returned signal as received at each of the plurality of radar devices, a three-dimensional location of the transponder relative to the wearable device; and
generating an input command for the artificial reality system that accounts for a distance between the transponder and the wearable device.

* * * * *

UNITED STATES PATENT AND TRADEMARK OFFICE
CERTIFICATE OF CORRECTION

PATENT NO. : 11,226,406 B1
APPLICATION NO. : 16/391229
DATED : January 18, 2022
INVENTOR(S) : Riccardo DeSalvo et al.

It is certified that error appears in the above-identified patent and that said Letters Patent is hereby corrected as shown below:

In the Claims

In Column 29, Line 14, in Claim 11, delete "receiver," and insert -- receive, --.

Signed and Sealed this
Twenty-sixth Day of April, 2022

Katherine Kelly Vidal
Director of the United States Patent and Trademark Office